(12) United States Patent
Witz et al.

(10) Patent No.: US 11,186,013 B2
(45) Date of Patent: Nov. 30, 2021

(54) PREFORM, A MOLD STACK FOR PRODUCING THE PREFORM, AND A PREFORM HANDLING APPARATUS FOR HANDLING THE PREFORM

(71) Applicant: Husky Injection Molding Systems Ltd., Bolton (CA)

(72) Inventors: Jean-Christophe Witz, Yutz (FR); Ralf Walter Fisch, Saarburg (DE); Christophe Simon Pierre Beck, Terville (FR)

(73) Assignee: HUSKY INJECTION MOLDING SYSTEMS LTD., Bolton (CA)

( * ) Notice: Subject to any disclaimer, the term of this patent is extended or adjusted under 35 U.S.C. 154(b) by 233 days.

(21) Appl. No.: 15/742,989

(22) PCT Filed: Jun. 16, 2016

(86) PCT No.: PCT/CA2016/050701
§ 371 (c)(1),
(2) Date: Jan. 9, 2018

(87) PCT Pub. No.: WO2017/020116
PCT Pub. Date: Feb. 9, 2017

(65) Prior Publication Data
US 2019/0118409 A1 Apr. 25, 2019

Related U.S. Application Data

(60) Provisional application No. 62/315,396, filed on Mar. 30, 2016, provisional application No. 62/199,296, filed on Jul. 31, 2015.

(51) Int. Cl.
*B29B 11/08* (2006.01)
*B29B 11/14* (2006.01)
(Continued)

(52) U.S. Cl.
CPC .............. *B29B 11/08* (2013.01); *B29B 11/14* (2013.01); *B29C 49/06* (2013.01);
(Continued)

(58) Field of Classification Search
CPC ..................... B29B 11/08; B29B 11/14; B29B 2911/14331; B29B 2911/14373; B29C 49/4205; B29C 49/06; B29C 2049/4226
See application file for complete search history.

(56) References Cited

U.S. PATENT DOCUMENTS 3,159,697 A 12/1964 Tocci
3,309,443 A 3/1967 Scott Jr. et al.
(Continued)

FOREIGN PATENT DOCUMENTS

JP 01202417 A 8/1989
JP 2001047476 A 2/2001
(Continued)

OTHER PUBLICATIONS

PCT International Search Report, 4 pages, Aug. 19, 2016.
European Search Report, RAICHER, Gerald, Jun. 12, 2019, 15 pages.

*Primary Examiner* — Francisco W Tschen
*Assistant Examiner* — Guy F Mongelli

(57) ABSTRACT

A preform suitable for subsequent blow-molding into a final-shaped container comprises: a neck portion; a base portion; and a body portion extending between the neck portion and the base portion; the body portion being defined between an inner surface having a circular transverse cross-sectional shape and an outer surface also having a circular transverse cross-sectional shape, the inner and outer surfaces being non-concentric, such that a wall thickness of the body portion varies circumferentially around the preform. A preform handling apparatus for retrieving a preform from a mold comprises a take-off device having a preform carrier (Continued)

and a take-off device alignment mechanism for maintaining the preform carrier in alignment with a contact surface of a body portion of the preform regardless of any offset between a longitudinal axis of a cylindrical outer surface of the body portion and a longitudinal axis of a cylindrical inner surface of the body portion.

5 Claims, 10 Drawing Sheets

(51) Int. Cl.
  B29C 49/06 (2006.01)
  B29C 49/42 (2006.01)
(52) U.S. Cl.
  CPC . B29C 49/4205 (2013.01); *B29B 2911/14331* (2015.05); *B29B 2911/14373* (2013.01); *B29C 2049/4226* (2013.01)

(56) References Cited

U.S. PATENT DOCUMENTS

| | | | |
|---|---|---|---|
| 3,894,835 A * | 7/1975 | Berggren | B29C 49/68 432/124 |
| D241,817 S | 10/1976 | Campbell et al. | |
| 4,197,083 A * | 4/1980 | Berggren | B29C 49/68 432/11 |
| 4,311,246 A | 1/1982 | Saito et al. | |
| 4,439,393 A | 3/1984 | Saito et al. | |
| 4,511,528 A * | 4/1985 | Kudert | B29C 45/16 264/328.8 |
| 4,745,013 A * | 5/1988 | Kudert | B29C 45/16 428/36.7 |
| 4,751,035 A * | 6/1988 | McHenry | B29C 48/185 264/255 |
| 4,755,404 A * | 7/1988 | Collette | B29C 49/0073 215/370 |
| 4,959,006 A * | 9/1990 | Feddersen | B29C 45/26 249/122 |
| 4,981,736 A * | 1/1991 | Feddersen | B29C 45/26 215/371 |
| 5,047,271 A * | 9/1991 | Feddersen | B29C 49/0078 215/371 |
| 5,057,267 A | 10/1991 | Seizert et al. | |
| 5,128,091 A * | 7/1992 | Agur | B29C 49/0042 264/129 |
| 5,256,341 A * | 10/1993 | Denis | B29B 11/00 264/492 |
| D354,916 S | 1/1995 | Park | |
| 5,455,088 A * | 10/1995 | Deemer | B29B 11/08 428/35.7 |
| 5,464,106 A * | 11/1995 | Slat | B29C 49/0073 215/12.1 |
| 5,851,476 A * | 12/1998 | Wydra | B29C 49/00 264/507 |
| 5,927,525 A * | 7/1999 | Darr | B29C 49/221 215/12.1 |
| 5,939,153 A * | 8/1999 | Valyi | B29B 11/14 215/12.1 |
| 6,099,766 A | 8/2000 | Aoki et al. | |
| 6,203,870 B1 * | 3/2001 | Darr | B29B 11/14 215/12.2 |
| 6,352,426 B1 * | 3/2002 | Hutchinson | B29C 45/045 425/548 |
| 6,355,204 B1 * | 3/2002 | Hickman | B29C 49/0073 264/513 |
| 6,841,262 B1 | 1/2005 | Beck et al. | |
| 6,872,354 B1 | 3/2005 | Mol et al. | |
| D513,990 S | 1/2006 | Archeny | |
| 6,984,119 B1 | 1/2006 | Hickman et al. | |
| D555,481 S | 11/2007 | Tseng | |
| 7,357,967 B2 | 4/2008 | Osika et al. | |
| D682,110 S | 5/2013 | Gonzalez | |
| 8,899,962 B2 | 12/2014 | Mccready et al. | |
| 2002/0030307 A1 * | 3/2002 | Deemer | B29C 49/0078 264/535 |
| 2002/0148805 A1 * | 10/2002 | Wurster | B29C 49/48 215/374 |
| 2003/0020193 A1 * | 1/2003 | Hamamoto | B29C 49/0073 264/40.1 |
| 2003/0116526 A1 * | 6/2003 | Mehanna | B29C 49/0073 215/379 |
| 2004/0108627 A1 | 6/2004 | Schumann | |
| 2004/0247734 A1 | 12/2004 | Unterlander et al. | |
| 2005/0037169 A1 | 2/2005 | Przytulla et al. | |
| 2006/0051541 A1 * | 3/2006 | Steele | B29B 11/12 428/35.7 |
| 2008/0265455 A1 | 10/2008 | Chiarin | |
| 2009/0087507 A1 * | 4/2009 | Penet | B29C 49/48 425/525 |
| 2009/0220809 A1 * | 9/2009 | Bertheol | B29C 49/06 428/542.8 |
| 2010/0028577 A1 * | 2/2010 | Siegl | B29B 11/08 428/35.7 |
| 2010/0081003 A1 * | 4/2010 | Pagliacci | B29B 11/14 428/542.8 |
| 2010/0260886 A1 * | 10/2010 | Witz | B29B 11/14 425/521 |
| 2010/0307954 A1 * | 12/2010 | De Bruyn | B29C 49/20 206/524.6 |
| 2011/0020576 A1 * | 1/2011 | Sun | B29C 49/0073 428/36.92 |
| 2011/0290758 A1 * | 12/2011 | Detrois | B29B 11/14 215/379 |
| 2012/0061344 A1 * | 3/2012 | Hutchinson | B32B 5/18 215/382 |
| 2012/0118849 A1 * | 5/2012 | Harper | B29B 11/14 215/40 |
| 2013/0069268 A1 * | 3/2013 | Liu | B29B 11/08 264/75 |
| 2014/0263161 A1 * | 9/2014 | Guerin | B29C 49/4815 215/384 |
| 2016/0257029 A1 * | 9/2016 | Lane | B29C 49/0073 |
| 2018/0361624 A1 * | 12/2018 | Bunel | B29B 11/14 |

FOREIGN PATENT DOCUMENTS

| | | |
|---|---|---|
| WO | 200232651 A1 | 4/2002 |
| WO | 2009132419 A1 | 11/2009 |
| WO | 2016046370 A1 | 3/2016 |

\* cited by examiner

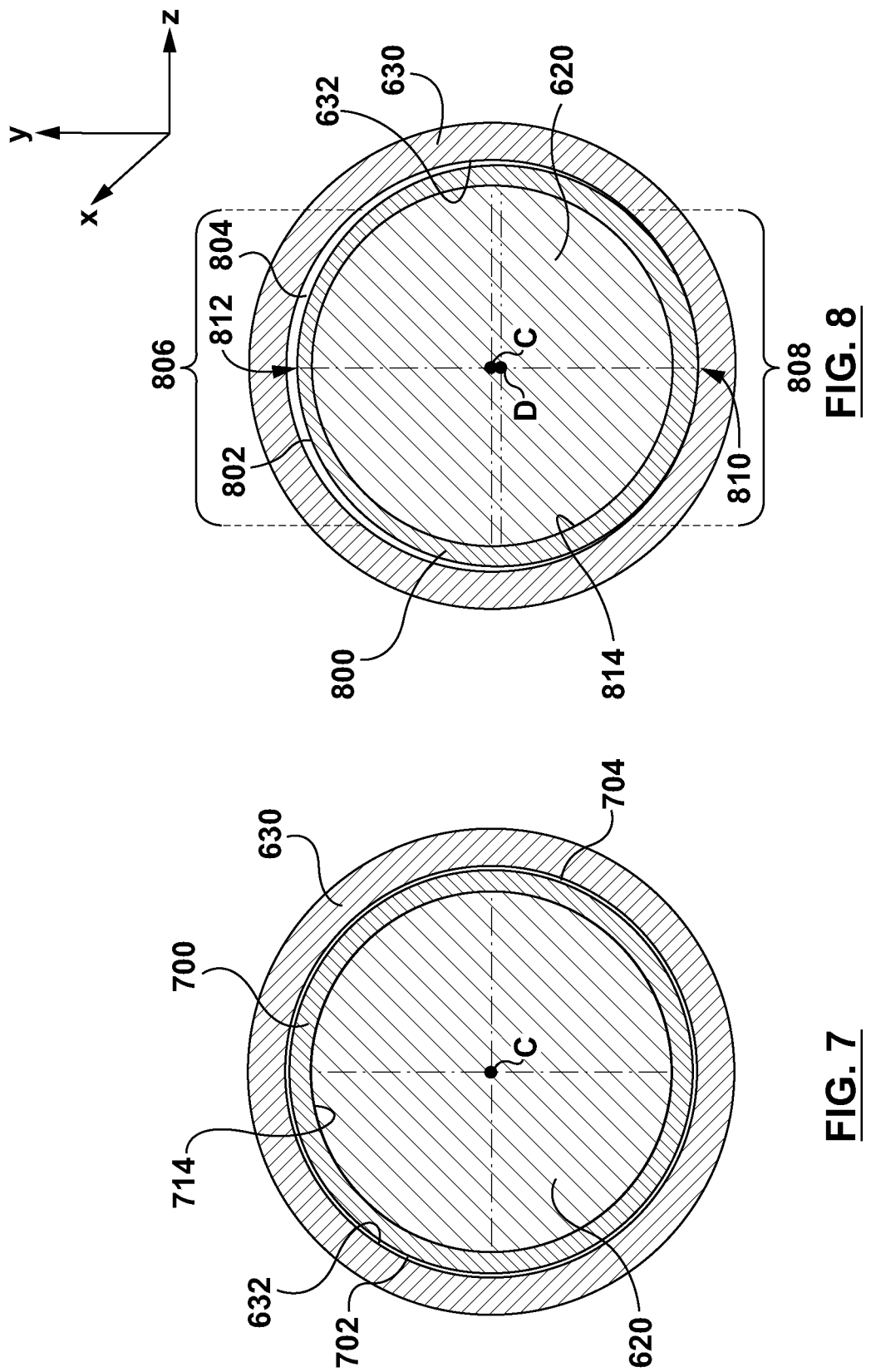

PREFORM, A MOLD STACK FOR PRODUCING THE PREFORM, AND A PREFORM HANDLING APPARATUS FOR HANDLING THE PREFORM

FIELD OF TECHNOLOGY

The present technology generally relates to, but is not limited to, molding systems and processes, and more specifically the present technology relates to, but is not limited to, a preform, a mold stack for producing the preform, and preform handling apparatus for handling the preform.

BACKGROUND

Molding is a process by virtue of which a molded article can be formed from molding material by using a molding system. Various molded articles can be formed by using the molding process, such as an injection molding process. One example of a molded article that can be formed, for example, from polyethylene terephthalate (PET) material is a preform that is capable of being subsequently blown into a beverage container, such as a bottle and the like.

As an illustration, injection molding of PET material involves heating the PET material to a homogeneous molten state and injecting, under pressure, the so-melted PET material into a molding cavity defined, at least in part, by a female cavity piece and a male core piece mounted respectively on a cavity plate and a core plate of a mold. The cavity plate and the core plate are urged together and are held together by clamp force, the clamp force being sufficient to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core piece. Thereafter, the molded article can be ejected off of the core piece by use of one or more ejection structure. Ejection structures are known to assist in removing the molded articles from the core halves. Examples of the ejection structures include stripper plates, stripper rings and neck rings, ejector pins, etc.

With reference to FIG. 1, a preform 100 is depicted, the preform 100 being an example of a typical prior art preform. The preform 100 consists of a neck portion 102, a base portion 106 and a body portion 104 extending between the neck portion 102 and the base portion 106. The base portion 106 is associated with a substantially spherical shape (specifically, hemispherical) that terminates in a vestige portion 108.

The preform depicted in FIG. 1 is typically used for blow-molding into a beverage container, such as a bottle for a still or carbonated beverage. A typical final blow-molded bottle is shown in FIG. 2 at 200, the bottle 200 being an example of a still water bottle. Such a container can be said to be a symmetrical container in a sense that the blown bottle 200 is circumferentially symmetrical around an imaginary central axis (not depicted) thereof.

There is another type of a final shaped container used in the industry, generally known as an "offset bottle" or an "offset neck bottle". An example of a typical offset bottle is depicted at 210 in FIG. 2. The bottle 210 is referred to as an "offset bottle" due to the fact that the neck of the bottle (i.e. a portion of the bottle 210 blown from the neck portion 102 of the preform 100) is offset from the imaginary central axis (not depicted) of the bottle 210. The imaginary central axis is also sometimes referred to by those of skill in the art as a "center of symmetry". Typically, the neck of the bottle 210 is offset to facilitate the ease of pouring of the liquid contained in the bottle 210, when in use. Alternatively, the neck of the bottle 210 can be offset for aesthetic or "branding" purposes. For example, it is a standard practice to offset necks of the bottles 210 that are destined to contain liquids such as (but not limited to): machine oil, washing detergents, household cleaning products and the like.

In order to produce a bottle (such as the bottle 200 or the bottle 210) from the preform 100, in a typical two-stage production process, the preform 100 is reheated using an infra-red (IR) or other type of a heating element of a blow-molding or a stretch-blow-molding machine. It is known to apply preferential (selective) reheating to different portions of the preform 100, when it is desired to stretch-blow-mold portions of the preform 100 differently, for example, when producing the bottle 210 having an offset neck finish or, otherwise, having a non-circular form. It is also known to apply preferential blow-molding to portions of the preform 100 to selectively stretch-blow-mold portions of the preform 100 to produce the bottle 210.

The design of the preform (such as length, wall thickness, neck finish design, support ledge design and the like) can vary from one preform to another and depends, amongst other things, on the type of the bottle to be blow molded from the preform, performance characteristics of the bottle to be blow molded from the preform, etc.

Examples of the various designs and features of the preforms can be found in the following documents:

U.S. Pat. No. 4,311,246 discloses a synthetic resin bottle produced by blow-molding a parison of a synthetic resin. In the blow-molding process of the parison, the portion of the parison supporting the handle is prevented from being expanded, thereby to sufficiently increase the supporting strength of the handle. Since the bottle product has its drum recessed in the vicinity of the handle, the grip of the handle can be facilitated.

US patent application 2005/0037169 teaches a method and a device for producing blow-molded plastic hollow bodies (60). The device is of enhanced design which avoids the shortcomings of traditional blow-molding technology. The extrusion die according to this invention is adjustable for different settings to produce different, partly overlapping wall thicknesses of the parison blank in order to compensate for the insufficiencies inherent in blow-molding and to obtain a finished blow-molded product with as consistent and uniform a wall thickness as possible, with an overlay, for instance in vertical wall areas, of evenly spaced longitudinal ribs (68). A technical concept is introduced whereby, as a novel process, the two conventional measures used to achieve a uniform wall thickness in the finished blow-molded hollow body are complemented by an additional, third step which makes it possible to produce containers whose hollow bodies (60) are provided with targeted, intentional and reproducible irregular wall thickness patterns.

U.S. Pat. No. 3,159,697 discloses Blow and compression molding eccentrically thick parison.

U.S. Pat. No. 3,309,443 teaches a plastic molding.

US patent application 2004/0108627 discloses system and method for making a specialized preform and for fabricating a container from the specialized preform that includes a first preform molding assembly in which a preliminary preform is molded so as to have a first sidewall portion that is thicker than the surrounding sidewall areas. A final preform is molded from the primary preform in a second preform molding assembly, wherein fluid pressure is utilized to mold the thickened first sidewall portion into a lateral projection that corresponds and size in shape to a handle structure that is desired in the final container. The specialized final preform is then positioned within a container mold that is constructed to pinch the lateral projection during blowmolding of the final container so as to define an integral molded handle portion having a central sealed slug area that is later removed.

U.S. Pat. No. 4,439,393 teaches a synthetic resin bottle produced by blow-molding a parison of a synthetic resin. In the blow-molding process of the parison, the portion of the parison supporting the handle is prevented from being expanded, thereby to sufficiently increase the supporting strength of the handle. Since the bottle product has its drum recessed in the vicinity of the handle, the grip of the handle can be facilitated.

U.S. Pat. No. 5,057,267 discloses a parison forming device for forming hollow polymer extrudes of variable wall thickness in either the circumferential or longitudinal directions, or in any combination thereof. The parison forming device consists of a die-head assembly and mandrel assembly, concentrically arranged, creating an annual opening. The inner or outer circumferential perimeter of the annular opening may be selectively modified at specific radial locations through radially displaceable slides positioned about the annular opening. The slides, attached to either the die-head assembly or mandrel assembly, may be actuated during parison formation via hydraulic or other methods so as to provide suitable wall thickness profiles for later finished polymer products.

U.S. Pat. No. 6,355,204 teaches a dual-chamber container that is formed in an injection blow molding process. Two preforms are injection molded around respective core rods. The preforms and core rods are then moved to a blow mold, in which the preforms are molded to the confines of the mold. The blow mold has partial walls between the two cavities, which provide directional control over the preforms as the preform wall portions are blown against and contact welded to each other. The outer walls of the preforms, which must travel and stretch a greater amount than the inner walls, are formed thicker in the preform molding operation.

U.S. Pat. No. 6,872,354 discloses parison for a container having a substantially constant wall thickness, the container having a base, a top edge defining a round opening, the top edge defining a plane which is not parallel to the plane of the base, a neck portion disposed at the same angle as the plane defined by the top edge, a front outer surface, and a rear outer surface having a lower portion and an upper portion. The parison comprises a cylindrical upper neck portion having a cavity extending therethrough, the upper nock having a top surface edge defining a top plane. The parison also has a hollow, elongated body portion having a closed lower end and an upper end, the lower body portion having a major axis extending in a direction parallel to the longitudinal axis of the cylindrical upper neck portion, and having a front wall and a rear wall. The front wall is thicker than said rear wall. Also included in the invention is a method of producing a bottle from the parison.

U.S. Pat. No. 7,357,967 teaches method of making an identifiable article such as a container or container preform. A molded plastic container or container preform is provided that includes a wall having at least one layer of matrix resin and at least one layer of barrier resin that is blended with an additive. The wall has at least one localized portion of predetermined geometry in which the barrier layer is thicker than surrounding portions of the wall, and within which the additive is discernable under visible or UV light so as to provide a means to prevent use of counterfeit containers.

U.S. design Pat. 241,817; U.S. design Pat. 354,916; U.S. design Pat. 513,990; U.S. design Pat. 555,481 and U.S. design Pat. 682,110 disclose various further implementation for a design of the preform 100.

SUMMARY

According to a first broad aspect of the present technology, there is provided a preform suitable for subsequent blow-molding into a final-shaped container. The preform comprises: a neck portion; a base portion; and a body portion extending between the neck portion and the base portion; the body portion being defined between a circular inner surface and a circular outer surface defined along laterally offset axis along substantially the entire length of the body portion, such that a wall thickness varies circumferentially around the preform.

In some embodiments of the preform, the wall thickness comprises a first point of a plurality of points around a circumference of the body portion and a second wall thickness at a second point of the plurality of points around the circumference of the body portion.

In some embodiments of the preform, the first wall thickness and the second wall thickness are selected based on blow-molding considerations for a respective one of the first point and the second point.

In some embodiments of the preform, one of the first wall thickness and the second wall thickness is selected to be larger where the respective one of the first point and the second point needs a longer travel distance during a blow-molding process.

In some embodiments of the preform, the base portion is defined between an inner end surface and an outer end surface that extend from the circular inner surface and the circular outer surface of the body portion, respectively, coaxially therewith, wherein a base thickness of the base portion varies circumferentially around the preform.

According to another broad aspect of the present technology, there is provided a preform suitable for subsequent blow-molding into a final-shaped container. The preform comprises: a neck portion; a base portion; and a body portion extending between the neck portion and the base portion; the body portion being defined between a circular inner surface and a circular outer surface, the body portion being associated with a wall thickness, the wall thickness being circumferentially uneven at any given cross section point along substantially the entire length of the body portion.

In some embodiments of the preform, the wall thickness comprises a first point of a plurality of points around a circumference of the body portion and a second wall thickness at a second point of the plurality of points around the circumference of the body portion.

In some embodiments of the preform, the first wall thickness and the second wall thickness are selected based on blow-molding considerations for a respective one of the first point and the second point.

In some embodiments of the preform, one of the first wall thickness and the second wall thickness is selected to be larger where the respective one of the first point and the second point needs a longer travel distance during a blow-molding process.

In some embodiments of the preform, the base portion is defined between an inner end surface and an outer end surface that extend from the circular inner surface and the circular outer surface of the body portion, respectively, coaxially therewith, wherein a base thickness being circumferentially uneven at any given cross section point along substantially the entire length of the base portion.

According to another broad aspect of the present technology, there is provided a molding stack for producing a preform, the preform being suitable for subsequent blow-molding into a final-shaped container, the preform having a neck portion; a base portion; and a body portion extending between the neck portion and the base portion. The molding stack comprises: a core insert for defining an inner skin of the preform, a cavity insert for defining an outer skin of the body portion; a gate insert for defining a portion of an outer skin of the base portion; and a pair of neck rings for defining a portion of an outer skin of the neck portion, at least one of the core insert, the cavity insert, the gate insert and the pair of neck rings being dimensioned for defining the body portion of the preform, such that the body portion is defined between a circular inner surface and a circular outer surface defined along laterally offset axes along substantially the entire length of the body portion, such that a wall thickness varies circumferentially around the preform.

In some embodiments of the molding stack, the molding stack further comprises a core lock ring for attaching, in use, the core insert to a core plate.

In some embodiments of the molding stack, at least one of the core insert, the cavity insert, the gate insert and the pair of neck rings comprises the cavity insert and wherein during production of the cavity insert a geometry of a cavity molding surface is defined using at least one of a lathe operation, a milling operation and a splitting operation such that the body portion of the preform is defined between a circular inner surface and a circular outer surface defined along laterally offset axes along substantially the entire length of the body portion, such that a wall thickness varies circumferentially around the preform.

In some embodiments of the molding stack, at least one of the core insert, the cavity insert, the gate insert and the pair of neck rings comprises the gate insert and wherein during production of the gate insert a geometry of a base molding surface is defined using at least one of a lathe operation, a milling operation and a splitting operation such that the body portion of the preform is defined between a circular inner surface and a circular outer surface defined along laterally offset axes along substantially the entire length of the body portion, such that a wall thickness varies circumferentially around the preform.

In some embodiments of the molding stack, at least one of the core insert, the cavity insert, the gate insert and the pair of neck rings comprises the core insert and wherein during production of the core insert a geometry of a core molding surface is defined using at least one of a lathe operation, a turning and milling operation and a Direct Metal Laser Sintering (DMLS) operation such that the body portion of the preform is defined between a circular inner surface and a circular outer surface defined along laterally offset axes along substantially the entire length of the body portion, such that a wall thickness varies circumferentially around the preform.

According to yet another broad aspect of the present technology, there is provided a preform suitable for subsequent blow-molding into a final-shaped container. The preform comprises: a neck portion; a base portion; and a body portion extending between the neck portion and the base portion; the body portion being defined between an inner surface and an outer surface, the body portion defining a circumferential wall thickness along substantially the entire length of the body portion, the circumferential wall thickness being non-uniform circumferentially around the preform.

In some embodiments of the preform, the base portion is defined between an inner end surface and an outer end surface that extend from the circular inner surface and the circular outer surface of the body portion, respectively, coaxially therewith, wherein a base thickness being circumferentially non-uniform around the preform.

According to yet another aspect of the present technology, there is provided an injection molding system, comprising: a mold for molding a preform having a body portion, the body portion of the preform having a cylindrical inner surface and a cylindrical outer surface, the cylindrical outer surface being offset, in an offset dimension, from the cylindrical inner surface such that a wall thickness of the body portion varies about a circumference of the preform; and a take-off device for retrieving the preform from the mold, the take-off device being movable, in the offset dimension, between an outboard position and an inboard preform-loading position.

In some embodiments of the injection molding system, the take-off device comprises a preform carrier and, when the take-off device is in the inboard preform-loading position, the preform carrier is aligned with whichever one of the cylindrical inner and outer surfaces of the body portion of the preform shall act as a contact surface during preform retrieval by the preform carrier.

In some embodiments of the injection molding system, the cylindrical outer surface of the body portion of the preform acts as the contact surface during preform retrieval by the preform carrier, the preform carrier is configured to retrieve the preform from a mold core of the mold, and the preform carrier is offset from the mold core, in the offset dimension, when in the inboard preform-loading position.

According to a further aspect of the present technology, there is provided a preform handling apparatus for retrieving a preform from a mold core half of a mold, comprising: a take-off device having a preform carrier, and a take-off device alignment mechanism for maintaining the preform carrier in alignment with a cylindrical outer surface of a body portion of the preform regardless of whether the cylindrical outer surface of the body portion of the preform is concentric with a cylindrical inner surface of the body portion of the preform.

In some embodiments of the preform handling apparatus, the take-off device alignment mechanism defines a first preform-loading position for the take-off device for use when the cylindrical outer surface of the body portion of the preform is concentric with the cylindrical inner surface of the body portion of the preform and a second preform-loading position for the take-off device for use when the cylindrical outer surface of the body portion of the preform is offset from the cylindrical inner surface of the body portion of the preform. The take-off device may be movable from an outboard position to either of the first and second preform-loading positions.

In some embodiments of the preform handling apparatus, the take-off device is movable along a linear trajectory in a spatial dimension and each of the first and second preform-loading positions is situated along the linear trajectory.

In some embodiments of the preform handling apparatus, the preform is molded so that the cylindrical outer surface of the body portion of the preform is offset from the cylindrical inner surface of the body portion of the preform in the spatial dimension in which the take-off device is movable.

In some embodiments of the preform handling apparatus, a distance between the first preform-loading position and the second preform-loading position is one-half of a difference in wall thickness between a thickest wall of the body portion of the preform and a thinnest wall of the body portion of the preform.

According to another aspect of the present technology, there is provided a preform handling apparatus for retrieving, from a mold half of a mold, a preform having a body portion with a cylindrical inner surface and a cylindrical outer surface, the preform handling apparatus comprising: a take-off device having a preform carrier; and a take-off device alignment mechanism for selectively adjusting the take-off device between: a first preform-loading position, relative to the mold half, for use when the cylindrical inner and outer surfaces of the body portion of the preform are concentric; and a second preform-loading position, relative to the mold half, for use when the cylindrical inner and outer surfaces of the body portion of the preform are non-concentric.

In some embodiments of the preform handling apparatus, the mold half is a mold core half comprising a mold core and: in the first preform-loading position of the take-off device, the preform carrier is aligned with the mold core; and in the second preform-loading position of the take-off device, the preform carrier is offset from the mold core.

In some embodiments of the preform handling apparatus, the cylindrical outer surface of the body portion of the preform is offset, by an offset distance, from the cylindrical inner surface of the body portion of the preform, and the second preform-loading position is offset from the first preform-loading position by the same offset distance.

In some embodiments of the preform handling apparatus, the offset distance equals one-half of a difference in wall thickness between a thickest wall and a thinnest wall of the body portion of the preform when the cylindrical inner and outer surfaces of the body portion of the preform are non-concentric.

In some embodiments of the preform handling apparatus, the take-off device is movable, in a spatial dimension, between an outboard position and the first and second preform-loading positions.

In some embodiments of the preform handling apparatus, the take-off device is movable, in a first spatial dimension, between an outboard position and either the first preform-loading position or the second preform-loading position, and the take-off device is adjustable, in a second spatial dimension orthogonal to the first spatial dimension, between the first and second preform-loading positions.

According to yet another aspect of the present technology, there is provided a method of using a take-off device having a preform carrier to retrieve a preform from a mold half, comprising: when cylindrical inner and outer surfaces of a body portion of the preform are concentric, placing the take-off device in a first preform-loading position relative to the mold half; and when the cylindrical inner and outer surfaces of a body portion of the preform are non-concentric, placing the take-off device in a second preform-loading position relative to the mold half, so that, regardless of which of the cylindrical inner and outer surfaces of the body portion of the preform shall act as a contact surface during preform retrieval by the preform carrier, the preform carrier shall be aligned with the contact surface of the body portion of the preform.

In some embodiments of the method, the placing of the take-off device in the first or second preform-loading position comprises moving the take-off device, from an outboard position, along a linear trajectory, to the first or second preform-loading position respectively, and each of the first and second preform-loading positions is defined along that same linear trajectory.

According to still another aspect of the present technology, there is provided a preform handling apparatus for retrieving a preform from a mold, comprising: a take-off device having a preform carrier, and a take-off device alignment mechanism for maintaining the preform carrier in alignment with a contact surface of a body portion of the preform regardless of any offset between a longitudinal axis of a cylindrical outer surface of the body portion of the preform and a longitudinal axis of a cylindrical inner surface of the body portion of the preform.

These and other aspects and features will now become apparent to those skilled in the art upon review of the following description of specific non-limiting embodiments in conjunction with the accompanying drawings.

DESCRIPTION OF THE DRAWINGS

A better understanding of the non-limiting embodiments of the present technology (including alternatives and/or variations thereof) may be obtained with reference to the detailed description of the non-limiting embodiments along with the following drawings, in which:

FIGS. 7 and 8 are transverse cross-sectional views of a preform carrier in the molding system of FIG. 6 during retrieval of a preform;

DETAILED DESCRIPTION OF EMBODIMENTS

Reference will now be made in detail to various non-limiting implementations for producing a preform. It should be understood that other non-limiting implementations, modifications and equivalents will be evident to one of ordinary skill in the art in view of the non-limiting implementations disclosed herein and that these variants should be considered to be within scope of the appended claims. Furthermore, it will be recognized by one of ordinary skill in the art that certain structural and operational details of the non-limiting implementations discussed hereafter may be modified or omitted (i.e. non-essential) altogether. In other instances, well known methods, procedures, and components have not been described in detail.

It is to be further expressly understood that the injection mold and its components, as well as specific implementation details of the preform, are depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the injection mold and/or its components may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the injection mold and/or its components may provide in certain instances simple implementations of the present technology, and that where such is the case they have been presented in this manner as an aid to understanding. As persons skilled in the art would understand, various implementations of the present technology may be of a greater complexity. Furthermore, where specific details of the different implementations are presented with reference to discrete implementations, a person skilled in the art is expected to combine specific implementational details of one discrete implementation with specific implementational details of another discrete implementation, even though such a combination may not be expressly disclosed herein below.

Figures 3, 3A:
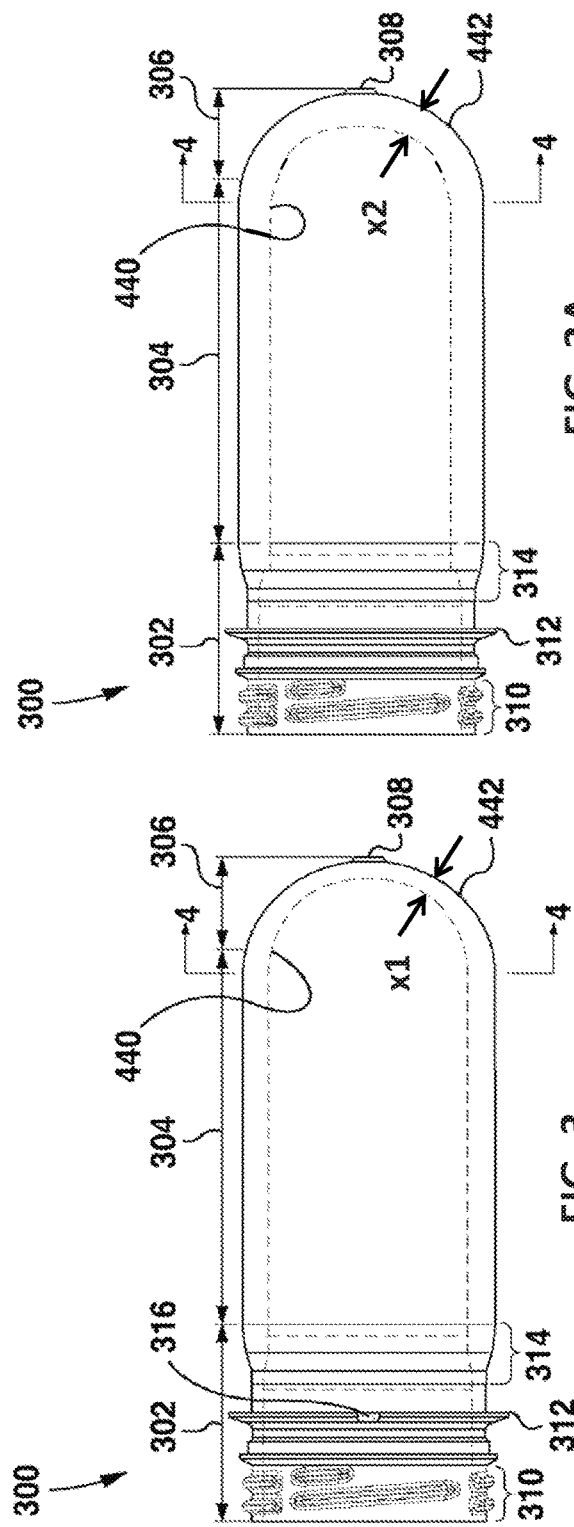
FIG. 3 is a side view of a preform implemented in accordance with non-limiting embodiments of the present technology.
FIG. 3A is another side view of the preform as shown on FIG. 3, the preform being rotated along an imaginary central axis thereof.

Reference is now made to FIG. 3, which depicts a schematic representation of a preform 300 implemented according to a non-limiting embodiment of the present technology. In some embodiments of the present technology, the preform 300 can be made from polyethylene terephthalate (PET) material. Naturally, other suitable thermoplastic materials can be used for producing the preform 300. The preform 300 can be a single layer preform (i.e. made from a single material) or a multi-layer preform (such as made from two or more layers of either different materials of a virgin-recycled layered structure of the same material). The material or materials may include a barrier material or a material incorporating an additive.

As will described below in greater detail, the preform 300 can be made injection molded using an injection molding machine, such as one provided by Husky Injection Molding Ltd of 500 Queen Street South, Ontario, L7E 5S5, Canada. Naturally, the preform 300 can be manufactured using other known methods and equipment, such as but not limited to: compression molding, injection compression molding, extrusion blow molding, transfer molding and the like.

The preform 300 is suitable for blow-molding into a final shaped container, such as a beverage bottle or other container. Numerous blow-molding machines and stretch-blow-molding machines (together referred to as "blow-molding machines" for simplicity) can be used, for example, one provided by Sidel International AG Bösch 67, 6331 Hünenberg, Switzerland.

The preform 300 comprises neck portion 302, a base portion 306 and a body portion 304 extending between the neck portion 302 and the base portion 306.

The neck portion 302 includes a threaded portion 310, a support ledge 312 and a transition portion 314 between the support ledge 312 and the body portion 304. The threaded portion 310 is configured for cooperating with a threaded portion of a closure (not depicted). The support ledge 312 is configured for cooperation with handling equipment of the blow-molding machine during various staged of the blow-molding process. The support ledge 312 comprises a locating feature 316 (the function of the locating feature 316 will be described in greater detail herein below). The base portion 306 has a substantially hemispherical shape that terminates in a vestige portion 308. The base portion 306 can be associated with a different shape, such as a substantially conical shape, a bullet shape and the like, in other embodiments.

As is generally known, the neck portion 302 does not normally undergo any transformation during the blow-molding process, while the body portion 304 and the base portion 306 undergo a transformation process during the blow-molding process—from a shape depicted in FIG. 3 to a final container shape, such as that of the bottle 200 or bottle 210.

Figure 4:
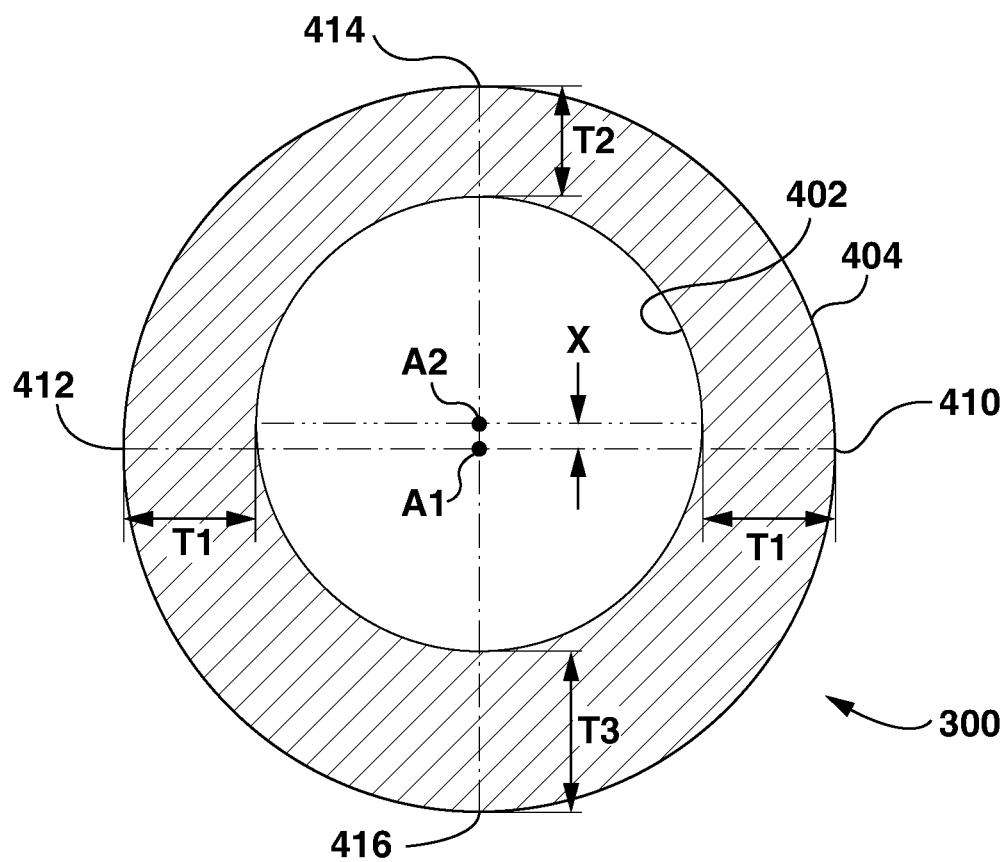
FIG. 4 is a section view of the preform of FIG. 3, section taken along lines 4-4.

FIG. 4 depicts a cross section of the preform 300 of FIG. 3, the cross section taken along lines 4-4 of FIG. 3. It should be noted that the cross section to be described with reference to FIG. 3 would be substantially the same if taken at any point along substantially the entirety of the length of the body portion 304 (i.e. between the base portion 306 and a beginning of the transition portion of the neck portion 302). For the avoidance of doubt, the term "substantially", as used in this paragraph and elsewhere in this application when referring to the wall thickness at any given cross-sectional point of the body portion 304 along the entirety of the length of the preform 300, is meant to connote that the thickness and profile of the body portion 304 is meant to be the same along the entirety of the length of the body portion 304 save for variations in plastic shrinking during cooling of the preform 300. In other words, the thickness and profile of the body portion 304 is designed to be the same along the entirety of the length of the body portion 304 (for example, by means of a "steel drawing"). However, due to uneven cooling and/or slightly different cooling behavior portions of the body portion 304 may shrink differently and, therefore, may be associated with dimensional variations from the nominal dimensions of the steel drawing. Additionally, in some embodiments of the present technology, in addition to being circumferentially non-even, the wall thickness can also be longitudinally non-even along substantially along some or all of the length of the body portion 304.

As can be seen in the illustration of FIG. 4, the body portion 304 is defined by a circular inner surface 402 and circular outer surface 404. Put another way, the transverse cross-sectional shape of the inner surface 402 is circular, as is the transverse cross-sectional shape of the outer surface 404. Sometimes, the circular inner surface 402 is called "inner skin of the preform" by those of skill in the art, while the circular outer surface 404 is called an "outer skin of the preform". According to embodiments of the present technology, the thickness of the body portion 304 can be said to be circumferentially uneven along substantially the entirety of the length of the body portion 304. In the embodiment depicted in FIG. 4, four illustrative points along the circumference of the body portion 304 have been labelled with the associated wall thicknesses: a first point 410, a second point 412, a third point 414 and a fourth point 416.

Within the illustrated embodiment, the wall thickness of the body portion 304 at the first point 410 and the second point 412 is T1, a wall thickness at the third point 414 is T2 and the wall thickness at the fourth point 416 is T3. Within the illustrated embodiment, T2<T1<T3, i.e. T2 is smaller than T1, and T1 is smaller than T3. It will be appreciated that the first point 410, the second point 412, the third point 414 and the fourth point 416 in FIG. 4 have been selected to illustrate the varying wall thickness. Those of skill in the art will easily appreciate, for example, that the wall thickness gradually increases from T2 at the third point 414 to T1 at the first point 410 and the second point 412. By the same token, the wall thickness gradually increases from T1 at the first point 410 and the second point 412 to T3 at the fourth point 416.

In accordance with embodiments of the present technology, the wall thickness at any given portion of the circumference of the body portion 304 is selected based on behavior that one desires to achieve during the blow-molding process for the given portion of the circumference of the body portion 304. The selection of the wall thickness can be made by a designer of the preform 300 when designing the preform 300. More specifically, for the given portion of the circumference of the body portion 304 where it is desirable to effect higher rate of stretching, a larger wall thickness (i.e. thicker wall) is selected. By the same token, for the given portion of the circumference of the body portion 304 where it is desirable to effect lesser rate of stretching, a smaller wall thickness (i.e. thinner wall) is selected. Using the example of the FIG. 3 and FIG. 4 embodiment, the wall thickness around the circumference of the body portion 304 of the preform 300 has been selected such as to effect, during the blow-molding: (i) comparatively least stretching at the third point 414; (ii) comparatively more stretching at the first point 410 and the second point 412 in comparison to the third point 414; and (iii) comparatively most stretching at the fourth point 416 as compared to the first point 410 and the second point 412 (and, therefore, compared to the third point 414).

Thus, the inner and outer surfaces of the body portion of the preform are non-concentric, in the sense that the circular outer surface 404 has a longitudinal axis A1 that is parallel to but laterally offset, in an offset dimension (which is vertical in FIG. 4), from a longitudinal axis A2 of the circular inner surface 402 along substantially the entire length of the body portion. A wall thickness accordingly varies circumferentially around the preform 300.

Depicted in FIG. 4 is an offset X—an offset between the central axis A2 of the circular inner surface 402 and the central axis A1 of the circular outer surface 404. In some embodiments of the present technology, the offset X can be very small (i.e. marginally greater than 0 mm), such as, for example, 0.25 mm. Within these specific implementation, the variation of the wall thickness between the thickest wall thickness T3 at the fourth point 416 and the smallest wall thickness T2 at the third point 414 can be 0.5 mm. It should be noted, however, that the offset X can vary in in other embodiments of the present technology. The specific offset X can be selected based, amongst other things, on the size of the bottle to be blow molded from the preform 300. In some embodiments of the present technology, the offset X can vary between 0.2 mm and 4 mm. In other embodiments, the offset X can start in the range of 0.05 mm-0.1 mm.

Figure 5:
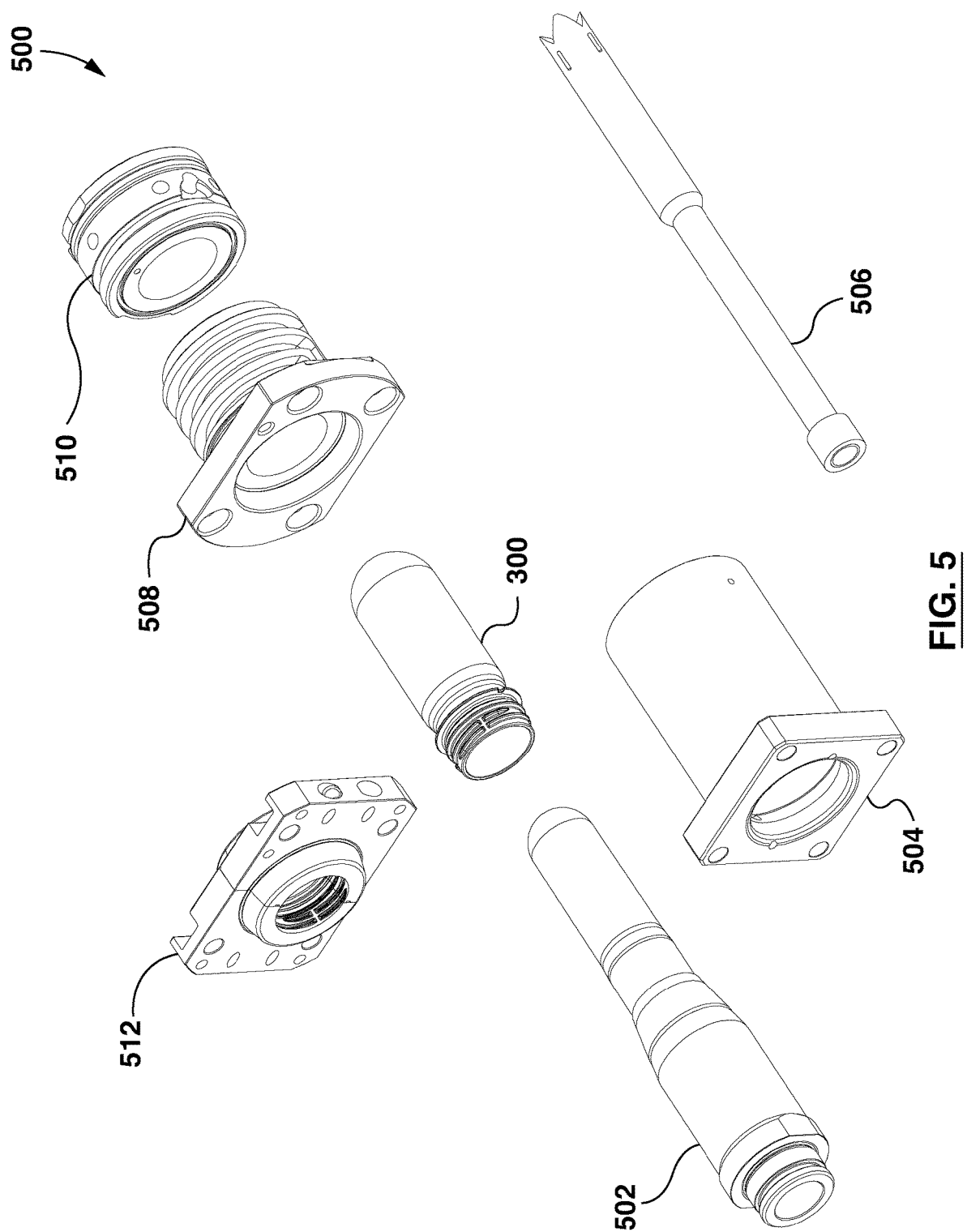
FIG. 5 is an exploded view of a molding stack that can be used for producing the preform of FIG. 3.

As has been alluded to above, the preform 300 can be produced using an injection molding system. With reference to FIG. 5, there is depicted an exploded view of a molding stack (or "mold stack") that can be used for producing the preform of FIG. 3, the molding stack being depicted at 500. The molding stack 500 can be used in conjunction with an injection molding machine system, discussed below.

The molding stack 500 includes: a core insert 502, a core lock ring 504, a core cooling tube 506, a cavity insert 508, a gate insert 510 (or "base insert" 510) and a pair of neck rings 512. These components of the molding stack 500 are generally known in the art and will only be briefly described below as far as modifications thereto are necessary for manufacturing the preform 300.

The core insert 502 is configured to define the inner skin of the preform 300. To that end, the core insert 502 comprises a core molding surface (not numbered) for defining, in use, the inner skin of the preform 300.

The core lock ring 504 is configured to attach the core insert 502 to a core plate (not depicted). In some embodiments of the present technology, the core lock ring 504 can be omitted and the core insert 502 can be coupled to the core plate by other means.

A core cooling tube 506 is configured to circulate a cooling fluid within the core insert 502. Typically, the cooling fluid (such as water or the like) is circulated through the core insert 502 (as well as other portions of the molding stack 500) during the appropriate portions of the molding cycle, such as during cooling portion thereof. The core cooling tube 506 is coupled, in use, to a source of a cooling fluid, which is typically a plant-wide supply of cooling fluid.

The cavity insert 508 is configured to define a portion the outer skin of the preform 300. More specifically, the cavity insert 508 is configured to define an outer skin of the body portion 304 of the preform 300. To that end, the cavity insert 508 comprises a cavity molding surface (not numbered) for defining, in use, the appropriate portion of the outer skin of the preform 300.

The gate insert 510 is configured to define another portion of the outer skin of the preform 300. More specifically, the gate insert 510 is configured to define an outer skin of the base portion 306 of the preform 300. To that end, the gate insert 510 comprises a base molding surface (not numbered) for defining, in use, the appropriate portion of the outer skin of the preform 300. In some embodiments of the present technology, the gate insert 510 geometry is on a same symmetry axis (i.e. longitudinal axis) as the inner diameter of the body portion 304. In other words, it can be said that the gate insert 510 and the core insert 502 are centered with respect to one another.

The pair of neck rings 512 comprises a pair of complimentary neck ring inserts, which are substantially mirror images of each other (these are not separately numbered). The pair of neck rings 512 is configured to define the outer skin of the preform 300. More specifically, the pair of neck rings 512 is configured to define certain portions of the outer skin of the neck portion 302 of the preform 300—such as the threaded portion 310, the support ledge 312 and the transition portion 314. As in known in the art, in order to release the various undercuts of the threaded portion 310 and the support ledge 312, the pair of neck rings 512 is configured to be laterally actuatable by known actuators, such as a cam and/or a servo motor (both not depicted).

The pair of neck rings 512 comprises a neck ring molding surface (not numbered) for defining, in use, the appropriate portion of the outer skin of the preform 300.

In some embodiments of the present technology, the molding stack 500 is configured to define a molding cavity (not depicted) for forming the preform 300, the preform 300 having a wall thickness that varies circumferentially around the preform 300 along substantially the entirety of the length of the body portion 304.

In some embodiments of the present technology, the cavity molding surface of the cavity insert 508 is sized and dimensioned to provide for the circumferentially varying wall thickness. This can be achieved by using any suitable machining methods such as, for example, a lathe operation. In some embodiments of the present technology, the lathe operation is executed using multiple steps having offset axes of rotation of the workpiece. That is, the workpiece may be rotated about a first axis of rotation when machining external features of the cavity and then rotated about a second axis of rotation, parallel and offset to the first axis, when machining the internal molding surface. In accordance with the present embodiment an outer diameter of the cavity insert 508 is first machine in a lathe machine (not depicted). Then, a flange surface (not numbered) of the cavity insert 508 is aligned. A third step is to move the cavity insert 508 out of center in direction of the flange surface with a value of the offset X. Finally, the cavity insert 508 is turned on the lathe machine using the "new" molding surface center axis (i.e. offset) to define the cavity molding surface.

In alternative embodiments of the present technology, the cavity molding surface can be made using a milling operation. This is particularly applicable (but not limited) to those embodiments, where the length of the cavity molding surface is comparatively short.

Yet in other embodiments of the present technology, the cavity molding surface can be made using by means of splitting the cavity insert 508 in a length-wise direction and milling the molding surface (together referred to as a "splitting operation").

Within these embodiments of the present technology, at least a portion of the base molding surface of the gate insert 510 can also be sized and dimensioned to provide for the circumferentially varying wall thickness. This can be achieved by the same operations as described above in respect to the cavity insert 508, namely but not limited to: lathe operation, milling operation, splitting operation and the like.

In alternative embodiments of the present technology, the core molding surface of the core insert 502 is sized and dimensioned to provide for the circumferentially varying wall thickness. This can be achieved by lathe operation. In alternative embodiments, the core molding surface of the core insert 502 can be sized and dimensioned using a turning and milling operation. In yet other embodiments, the core molding surface of the core insert 502 can be sized and dimensioned using a DMLS process. In yet additional embodiments, a hybrid process can be used—for example a combination of standard turning (for example, for the base) and DMLS (for example, for the core molding surface). Within these embodiments of the present technology, at least a portion of the neck ring molding surface of the pair of neck rings 512 can also be sized and dimensioned to provide for the circumferentially varying wall thickness. The portion of the neck ring molding surface that is modified can be the portion responsive for defining the transition portion of the neck portion 302 of the preform 300. This can be achieved by appropriate changes to the milling operation using a milling machine (not depicted).

In some embodiments of the present technology, modifications to other combinations or to all of the molding surfaces of the core insert 502, the cavity insert 508, the base insert 510 and the pair of neck rings 512 can be effected in order to provide for the wall thickness of the preform 300 that varies circumferentially around the preform 300 along substantially the entirety of the length of the body portion 304

In some embodiments of the present technology, the offset of the wall thickness of the body portion 304 is achieved by modifying the cavity molding surface of the cavity insert 508. Within these embodiments, a center axis of the neck portion 302 is aligned with a center axis the core insert 502.

In other embodiments of the present technology, the offset of the wall thickness of the body portion 304 is achieved by modifying the core molding surface of the core insert 502. Within these embodiments, the center axis of the neck portion 302 is aligned with a center axis the cavity insert 508.

In some embodiments of the present technology, after being molded and sufficiently cooled, the preform 300 is subjected to a blow-molding process to define a final-shaped blow molded container, such as the bottle 210. It should be noted that the blow-molding process does not have to be carried out at the same location as the molding process, nor does it need to be carried out by the same entity that carried out the molding process of the preform 300.

In some embodiments, the process of the blow-molding of the preform 300 is carried out in a blow-molding equipment (not depicted). The blow-molding equipment first reheats the preform 300 and then subjects it to blow-molding or stretch-blow-molding process. In some implementations of the blow-molding process, all portions of the preform 300 can be subjected to the same level and duration of reheating. In other implementations, the reheating process can be executed as a preferential reheating process, where some portions of the preform 300 is subjected to higher rates of reheating. How the preferential reheating is executed is not particularly limited. For example, the preferential reheating process can be effected by means of placing more lamps around or towards certain portions of the preform 300 when the preform 300 is in the reheating oven of the blow-molding equipment. Alternatively, the preferential reheating process can be effected by means of placing some of the lamps further away or closer to the surface of the preform 300 when the preform 300 is in the reheating oven of the blow-molding equipment or orienting the preform in a particular direction toward lamps.

For example, in some implementations, areas with substantially higher wall thickness can be subjected to higher degrees of reheating. For example, the preform 300 can be subjected to highest degree of reheating around the thickest fourth point 416 and the lowest degree of reheating around the thinnest third point 414, with the first point 410 and the second point 412 a degree of reheating that is in-between the degree of reheating for the third point 414 on one end of the spectrum (point 414 being the thinnest and, therefore, receiving the least reheating energy) and the fourth point 416 on the other end of the spectrum (point 416 being the thickest and, therefore, receiving the most reheating energy).

It should be noted that the preferential heating is an optional feature. As a matter of fact, embodiments of the present technology can lead to a technical effect where no preferential heating is required and where the blow molding behavior of the preform 300 is achieved via the circumferential wall thickness variations. Having said that, in some embodiments, it may be beneficial to add an additional technical effect by executing preferential reheating as discussed above.

In some embodiments, in order to locate the preform 300 in the blow mold (not depicted), the locating feature 316 is used. More specifically, the locating feature 316 can be used for orienting the preform 300 within either the reheating oven (to effect preferential reheating, for example) and/or in the blow mold. This can be particularly useful (but not limited to) in those embodiments, where the preform 300 is used for blow molding into a non-symmetrical container, such as the bottle 210. The locating feature 316 can be used to orient those portions of the preform 300 that have higher thickness relative to those portions of the blow mold, where the wall of the preform 300 would have to "travel" further distance to reach the final shape of the bottle 210. In alternative embodiments of the present technology, a feature other than the locating feature 316 can be used for positively locating the preform 300. Positive locating of the preform 300 can be executed by means of positively locating a start of the threaded portion 310 and the like.

Even though embodiments of the present technology have been described using an example of a so-called two-stage injection blow molding process, they are not so limited. As such, teachings presented herein can be equally applied to a single stage process, where the preform 300 is manufactured and substantially immediately blow-molded into the final shaped container—with or without additional reheating. In other words, rather than storing and/or transporting the preform 300 after it is molded, the preform 300 is blow molded into a hybrid injection—blow—molding equipment or in a blow molding machine located in vicinity of the injection molding machine.

It should be further noted that even though embodiments of the present technology have been described using an example of the offset of the wall thickness being substantially along the entirety of the body portion 304, the offset can also be effected in portions of the transition portion of the neck portion 302 and portions of the base portion 306. Additionally, even though embodiments of the present technology have been described using an example of the offset molding surfaces being used to define the circular inner surface 402 and a circular outer surface 404 with an offset therebetween (i.e. as means to define non-even circumferential wall thickness), in additional embodiments, the non-even circumferential wall thickness can be achieved by other means, for example, by means of non-cylindrical shaped outer molding surface of the core insert 502, non-cylindrical shaped inner molding surface of the cavity insert 508, etc.

In some embodiments of the present technology, the base portion 306 is defined between an inner end surface 440 and an outer end surface 442 (both depicted in FIG. 3) that extend from the circular inner surface 402 and the circular outer surface 404 of the body portion 304, respectively, coaxially therewith. The base thickness of the base portion is defined between the inner end surface 440 and the outer end surface 442. In some embodiments, the base thickness also varies circumferentially around the preform. The variability of the base thickness is illustrated by comparing a first base thickness x1 viewed on FIG. 3 when the preform 300 is in a first orientation, with a second base thickness x2, viewed on FIG. 3A when the preform 300 is rotated by 90 degrees about an imaginary central axis (not depicted) thereof.

Figure 3B:
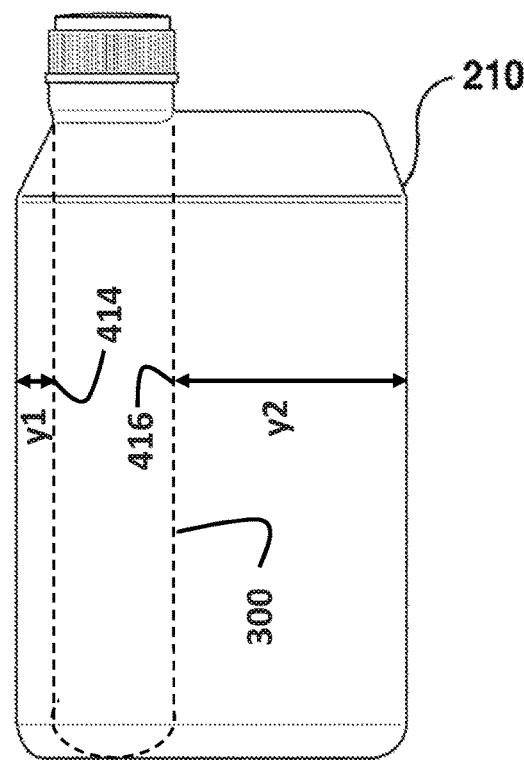
FIG. 3B is a schematic representation of a final-shaped blow-molded container and of a preform used to make the final-shaped blow-molded container.

Embodiments of the present technology can lead to a technical effect, whereby the preform 300 having a wall thickness that varies circumferentially around the preform 300 along substantially the entirety of the length of the body portion 304 is designed for producing the so-called off-set bottle (such as the bottle 210). Compared to the typical approach to making a preform for such the off-set bottle, which is typically made with a comparatively thicker wall thickness, to compensate for un-even blowing of various parts of the preform, the preform 300 designed in accordance with present technology may result in overall resin weight savings compared to a typical prior art approach. In a sense, embodiments of the present technology contemplate placing comparatively more material in those circumferential portions of the body portion 304 that, as illustrated on FIG. 3B, includes for example the fourth point 416 that will travel over a longer travel distance y2 during the blow-molding process and comparatively less material in those circumferential portions of the body portion 304 that, as illustrated on FIG. 3B, includes the third point 414 that will travel over a shorter travel distance y1 during the blow-molding process. In other words, the coordination between designing the circumferential wall thickness of the body portion 304 of the preform 300 with the blow-molding behavior when producing an off-set bottle can lead to a technical effect of overall weight savings compared to the prior art approaches.

Figure 6:
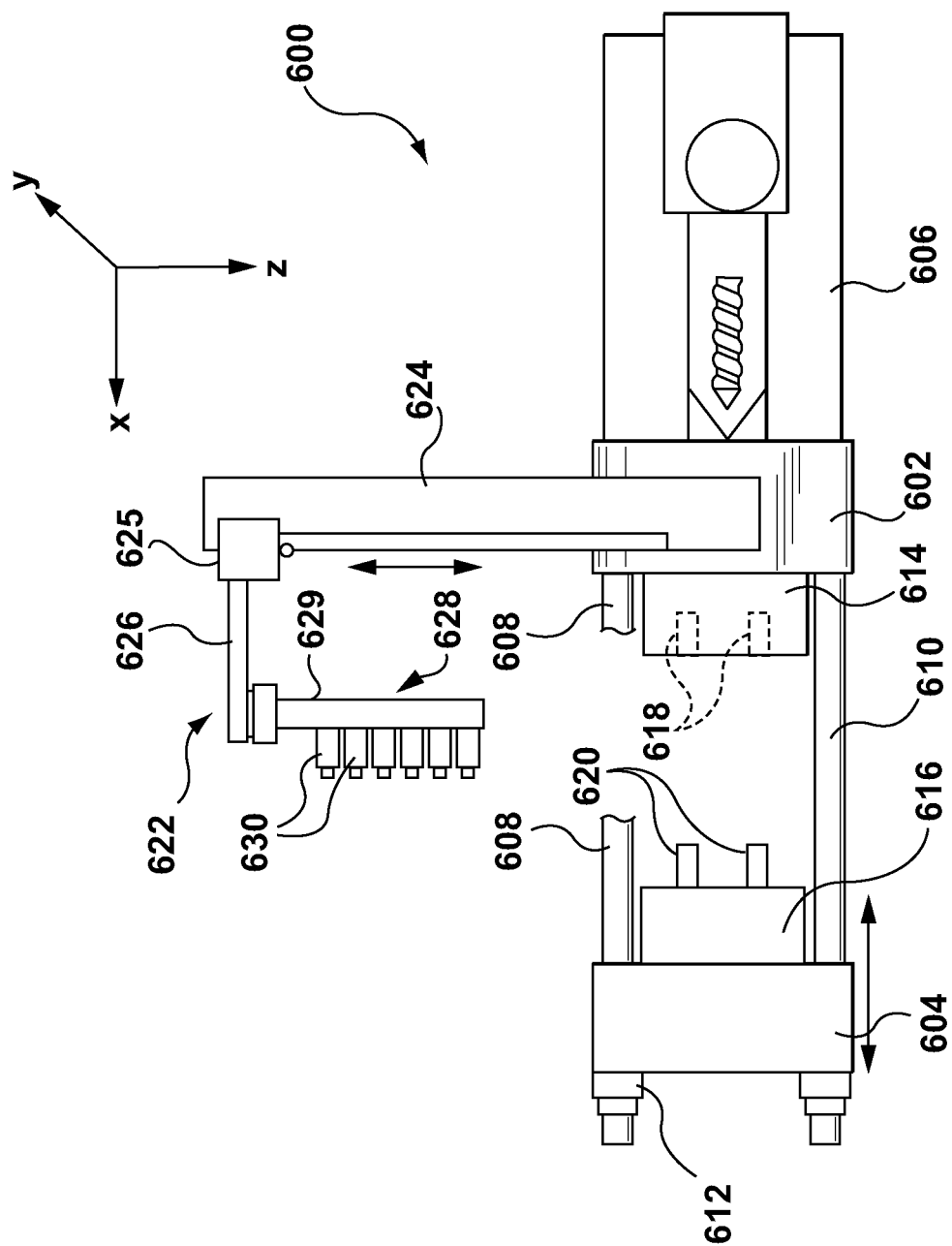
FIG. 6 is a schematic depiction of an injection molding system.

With reference to FIG. 6, there is depicted a non-limiting embodiment of an injection molding system 600 that may be used to produce the preform 300 of FIG. 3. The injection molding system 600 comprises a fixed platen 602 and a movable platen 604. The injection molding system 600 further comprises an injection unit 606 for plasticizing and injecting molding material. The movable platen 604 is movable along an operational axis of the mold, in a spatial dimension X, towards and away from the fixed platen 602, by means of stroke cylinders (not shown) or any other suitable means. Clamp force (also referred to as closure or mold closure tonnage) can be developed within the injection molding system 600, for example, by using tie bars 608, 610 and a tie-bar clamping mechanism 612, as well as (typically) an associated hydraulic system (not depicted) that is usually associated with the tie-bar clamping mechanism 612.

A first mold half 614 is associated with the fixed platen 602 and a second mold half 616 is associated with the movable platen 604. In the specific non-limiting embodiment of FIG. 6, the first mold half 614 comprises a plurality of mold cavities 618 (each being referred to generically as mold cavity 618; the plurality being referred to collectively as mold cavities 618). As such, the first mold half 614 can be generally thought of as a "mold cavity half." As will be appreciated by those of skill in the art, the mold cavities 618 may be formed from suitable mold inserts, such as inserts 508 and 510 of FIG. 5, or any other suitable means.

The second mold half 616 comprises a plurality of mold cores (or "core pieces") complementary to the plurality of mold cavities 618, the mold cores being referred to generically and collectively as mold core(s) 620. As such, the second mold half 616 can be generally thought of as a "mold core half." As will be appreciated by those of skill in the art, the one or more mold cores 620 may be formed from suitable mold inserts, such as core insert 502 of FIG. 5, or any other suitable means.

The first mold half 614 may be coupled to the fixed platen 602 by a suitable fastener (not depicted) or other means. Similarly, the second mold half 616 may be coupled to the movable platen 604 by a suitable fastener (not depicted) or other means. The first and second mold halves 614 and 616 may collectively be referred to as a "mold."

It should be understood that, in an alternative non-limiting embodiment, the position of the first mold half 614 and the second mold half 616 can be reversed and, as such, the first mold half 614 can be associated with the movable platen 604 and the second mold half 616 can be associated with the fixed platen 602. Moreover, in some alternative embodiments, the platen 602 may not be fixed but rather may as well be movable in relation to other components of the molding system 600.

FIG. 6 depicts the first mold half 614 and the second mold half 616 in a so-called "mold open position" where the movable platen 604 is positioned generally away from the fixed platen 602 and, accordingly, the first mold half 614 is positioned generally away from the second mold half 616. In the mold open position, a molded article (not depicted) can be removed from the first mold half 614 and/or the second mold half 616. In a so-called "mold closed position" (not depicted), the first mold half 614 and the second mold half 616 are urged together, by means of movement of the movable platen 604 towards the fixed platen 602, and cooperate to define (at least in part) a molding cavity (not depicted) into which the molten plastic (or other suitable molding material) can be injected. It should be appreciated that one of the first mold half 614 and the second mold half 616 can be associated with a number of additional mold elements, such as for example, one or more leader pins (not depicted) and one or more leader bushings (not depicted), the one or more leader pins cooperating with one more leader bushings to assist in alignment of the first mold half 614 with the second mold half 616 in the mold closed position, as is known to those of skill in the art.

The molding system 600 further includes a preform handling apparatus 622 comprising a beam 624, a carriage 625, an actuating arm 626 and a take-off device 628. The beam 624 is attached to the fixed platen 602 and extends in a spatial dimension denoted Z in FIG. 6, which may be horizontal. As such, the example beam 624 may be referred to as a "Z beam" or "horizontal beam." The carriage 625 is movable in spatial dimension Z, e.g. rides along the beam 624 in a linear trajectory, possibly being driven by an actuator such as a servo-electric driven belt drive (not expressly depicted). The actuating arm 626 is coupled to the carriage 625, and the take-off device 628 is coupled to the actuating arm 626. The preform handling apparatus 622 may be considered as a form of robot.

The take-off device 628 comprises an end-of-arm tool (EOAT) plate 629 (or simply "plate 629") having a plurality of preform carriers attached thereto. The preform carriers are referred to herein generically and collectively as preform carrier(s) 630. For clarity, the reason that plate 629 may be referred to as an end-of-arm tool plate 629 is that it is attached at a distal end of actuating arm 626.

Generally speaking, the purpose of each of the preform carriers 630 is to retrieve a preform from one of the mold halves. In this example, each preform carrier 630 is designed to remove a preform from one of the mold cores 620 of mold core half 616. Therefore, the preform carriers 630 in this embodiment may each take the form of a tube that is configured (e.g. sized and shaped) to receive and hold a preform 300 by its outer cylindrical surface 404 (see FIG. 4). The outer surface 404 may accordingly be referred to as the "contact surface" 404 of the preform in the present embodiment. Although perhaps less common, in alternative embodiments, a preform carrier may instead be designed to remove a preform from a respective mold cavity 618 of mold cavity half 614. In such embodiments, the preform carrier may be configured (e.g. sized and shaped) to hold a preform 300 by its inner cylindrical surface 402 (see FIG. 4), e.g. may take the form of a cylindrical rod that fits inside the preform. In that case, the inner cylindrical surface 402 of the preform, rather than the outer cylindrical surface 404, may be considered to be "contact surface" of the preform.

The exact number of preform carriers 630 on plate 629 is not particularly limited. For example, if a three-position post mold cooling cycle is to be implemented and if the molding system 600 comprises 72 instances of mold cavity 618 (for example, 12 rows of 6), the take-off device 628 could comprise 216 preform carriers 630 (i.e. twelve rows of 18). In another embodiment, the take-off device 628 may comprise twelve rows of twenty-five preform carriers 630, for a total of three hundred preform carriers 630. Other configurations are, of course, also possible and may be dictated by business considerations of an entity managing the molding system 600.

Referring again to FIG. 6, it will be appreciated that the take-off device 628 is shown in an outboard position, outboard of the two mold halves 614 and 616. In this position, the take-off device 628 does not obstruct the opening and closing of the mold along its operational axis in spatial dimension X. The take-off device 628 also has an inboard position (not expressly depicted in FIG. 6) which is attainable when the mold is in the "mold open" position, with mold halves 614, 616 being separated (as in FIG. 6). In the inboard position, the take-off device 628 is aligned with the mold half 616 so that the preform carriers 630 can retrieve freshly molded preforms from the mold cores 620. As such, the inboard position of the take-off device 628 may be referred to as the "preform-loading" or "inboard preform-loading" position of take-off device 628.

In operation, after a batch of preforms has been molded and the mold has been opened by separating mold halves 614, 616 in spatial dimension X (as in FIG. 6), the take-off device 628 may be moved, in spatial dimension Z, from its outboard position (as shown in FIG. 6) to the inboard preform-loading position adjacent to the mold half 616. The positioning of the take-off device 628 in the inboard position is such that each of the empty preform carriers 630 aligns with a mold core, as will be discussed in more detail below. The preforms are then retrieved, i.e. are transferred into the preform carriers 630, and the take-off device 628 is moved back to its outboard position in spatial dimension Z. The now-empty mold can thereafter be closed and clamped for the next molding cycle. As such, the take-off device 628 reciprocates in spatial dimension Z, in alternating sequence with the opening and closing of the mold halves 614, 616 in spatial dimension X.

It should be appreciated that injection molding system 600 may comprise a number of additional components, such as a hot runner, a treatment device for treating preforms held by preform carriers 630, and so forth, which are omitted from FIG. 6 brevity. It should also be understood that the molding system 600 may have other configurations. The description of the example system presented above has been provided as an example only and is not intended to be limiting. In other non-limiting embodiments of the present invention, the molding system 600 can have other configurations with more or fewer components.

Figure 1:
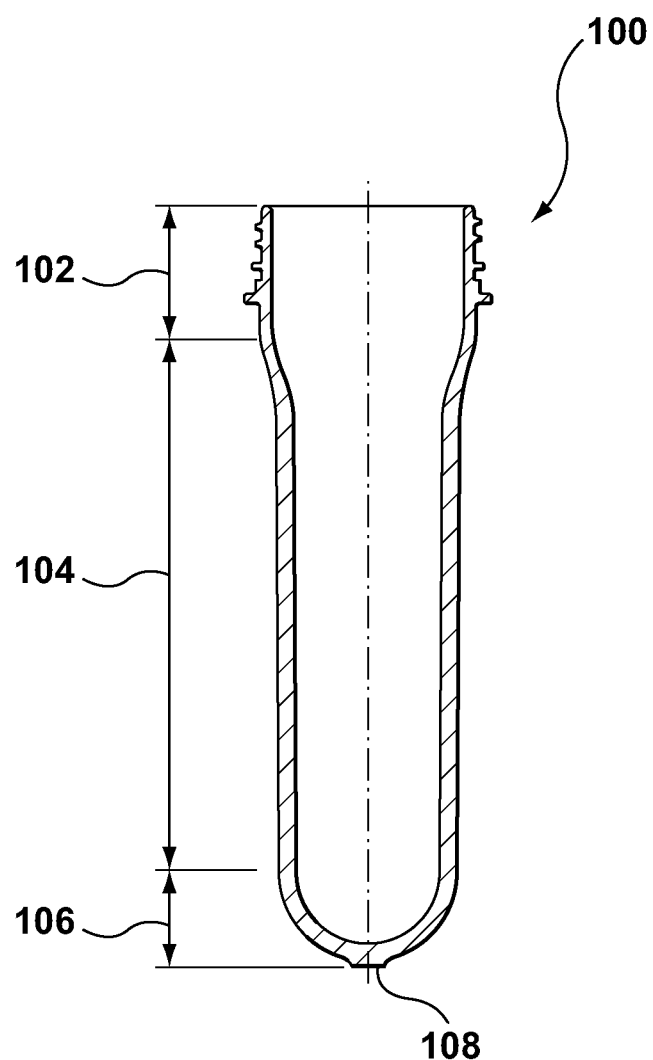
FIG. 1 depicts a cross section view of a preform implemented in accordance with known techniques.
Figure 2:
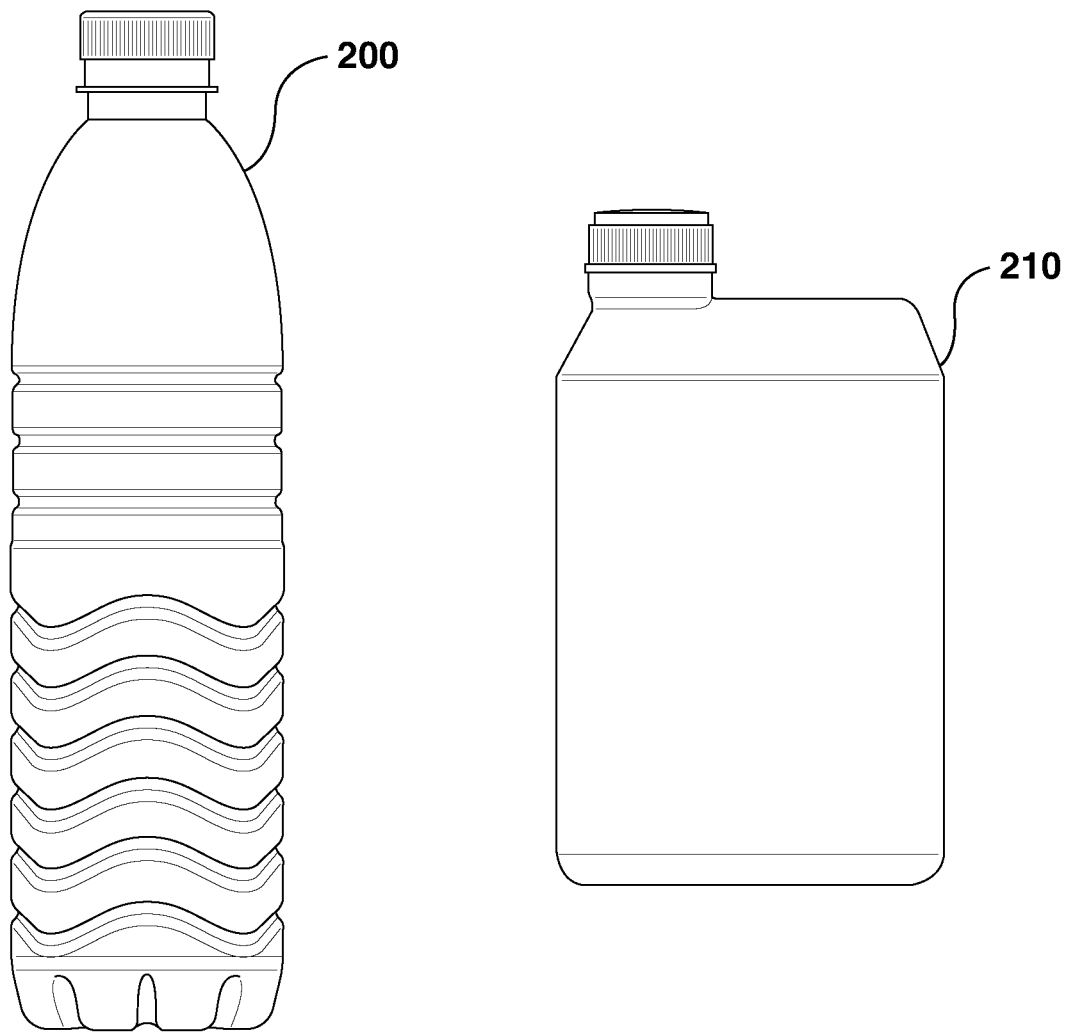
FIG. 2 is a schematic representation of two final-shaped blow-molded containers, both implemented in accordance with the known techniques.

It may be considered desirable to be able to use the injection molding system for molding, on one occasion, preforms having a body portion whose wall is substantially uniform in thickness about the circumference of the preform (e.g. such as preform 100 of FIG. 1), and to use the same injection molding system, on another occasion, for molding preforms 300 having a body portion whose wall varies in thickness about a circumference of the preform (e.g. such as preform 300 of FIG. 4). The injection molding system 600 may however be ill-suited for such multipurpose use (at least in a default configuration of the system 600), as placement of the take-off device 928 into a standard inboard preform-loading position may cause the preform carriers 630 to be misaligned with preforms of the latter type. This is illustrated in FIGS. 7 and 8.

FIGS. 7 and 8 are transverse cross-sectional views of a preform carrier 630 in the molding system 600 of FIG. 6 during retrieval of a preform 700 and a preform 800, respectively, from a mold core 620. The cross-sections of FIGS. 7 and 8 are each taken through the body portion of preform 700 and 800 respectively (analogous to the body portion 104 of the preform 100 of FIG. 1). In particular, FIG. 7 illustrates the case where the preform carrier 630 retrieves a conventional preform 700 whose wall thickness is substantially uniform about the circumference of the preform, i.e. whose cylindrical outer surface 702 is concentric with its cylindrical inner surface 714 in the body portion of the preform 700. FIG. 8 illustrates a different case where the preform carrier 630 retrieves a preform 800 whose wall thickness varies about the circumference of the preform, i.e. whose cylindrical outer surface 802 is non-concentric with (offset from) the cylindrical inner surface 814 in the body portion of the preform 800 (like preform 300 of FIG. 4).

As shown in to FIG. 7, the preform carrier 630 is aligned with mold core 620, in the sense that they both share a common longitudinal axis C. Moreover, it can be seen that the cylindrical inner surface 632 of the preform carrier 630 (also referred to as the "contact surface 632" of the preform carrier 630, because it comes into contact with the preform during preform retrieval) is concentric with, and closely surrounds, the outer cylindrical contact surface 702 of the preform 700. A slight circumferential gap 704 may exist between surfaces 702 and 632 for clearance purposes, e.g. to reduce a risk of damage to the contact surface 702 of the preform as the preform 700 is received within the preform carrier 630 during preform retrieval. The preform carrier 630 is said to be aligned with preform 700 in FIG. 7 because the contact surface 632 of the preform carrier 630 is concentric with the contact surface 702 of the preform 700.

In contrast, in FIG. 8, the preform carrier 630 is misaligned with preform 800, in the sense that the contact surface 632 of the preform carrier 630 is non-concentric with the contact surface 802 of the preform 800. In particular, although the contact surface 632 of the preform carrier 630 remains aligned (concentric) with the mold core 620 in this scenario (both sharing common longitudinal axis C), the cylindrical outer surface 802 of the preform 800 is non-concentric with the preform carrier 630. The reason is that the outer surface 802 of the preform is now centered about a longitudinal axis D, which is parallel to but offset from axis C in spatial dimension Y (mutually orthogonal spatial dimensions X, Y and Z in FIG. 8 corresponding to those of FIG. 6). Put another way, the non-concentricity of the outer surface 802 of the body portion of the preform 800 with the inner surface 814 of the body portion of the preform 800 causes the former to be out of alignment with the mold core 620 and thus the preform carrier 630.

As a result of the misalignment between the preform 800 and preform carrier 630, in one arcuate section 806 of the preform wall, there may be a gap 804 between contact surfaces 632 and 802 i.e. the preform 800 may be poorly supported or even unsupported (e.g. loose within the preform carrier) in that area. This may be particularly true at the thinnest section 812 of the preform wall, i.e. at the topmost wall section in FIG. 8. In contrast, on the opposite side of the preform 800, in arcuate section 808, there may either be no gap between contact surfaces 632 and 802, or worse, the inwardly facing contact surface 632 in section 808 may physically impinge upon the contact surface 802 of the preform 800. This may be particularly true at the thickest section 810 of the preform wall, i.e. at the bottommost wall section in FIG. 8. The latter may disadvantageously result in damage to the preform 800 due to contact between the preform carrier 530 and the outer surface of the preform 800 during an attempted retrieval of the preform 800 from mold core 620.

Figure 9:
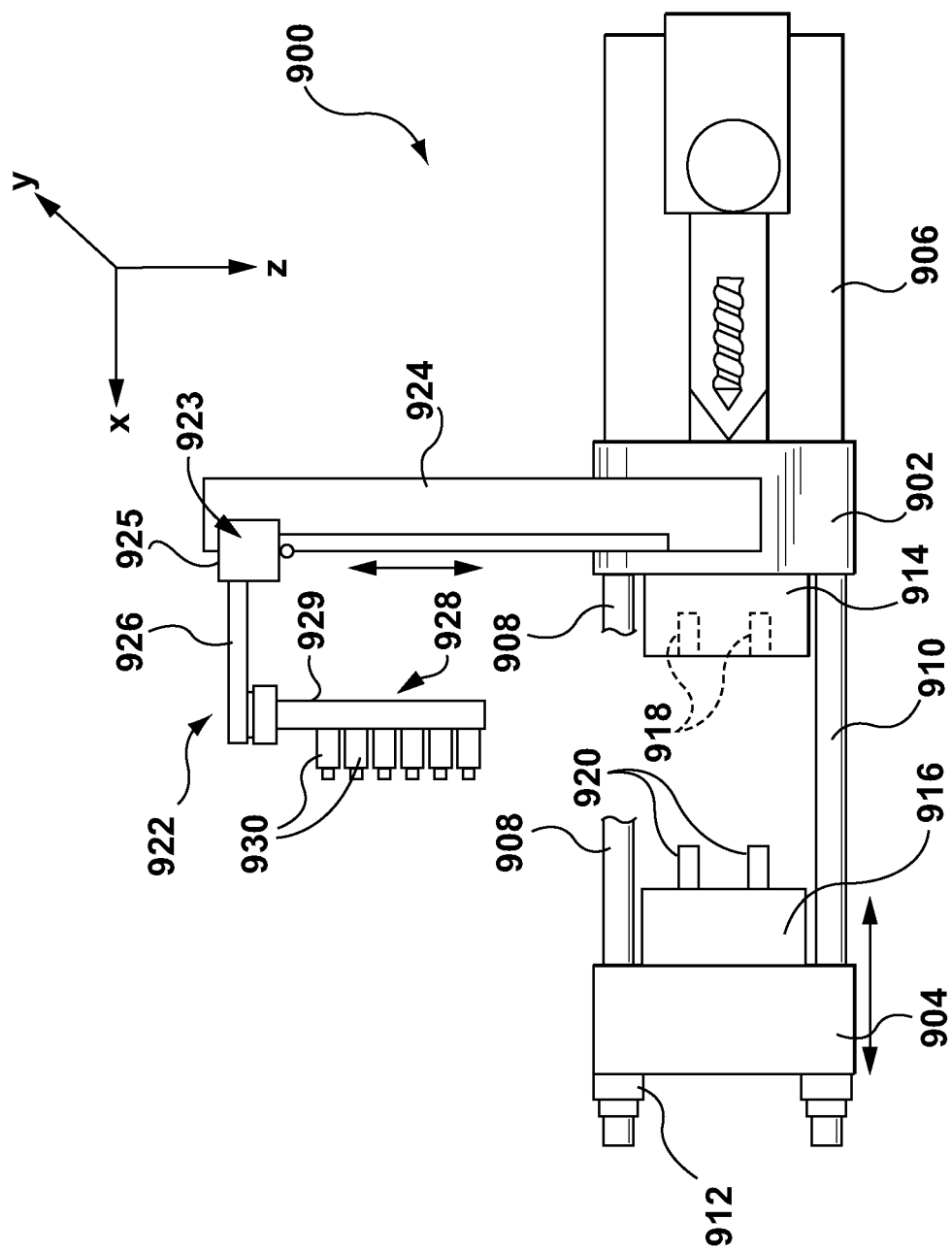
FIG. 9 is a schematic depiction of an alternative injection molding system.

With reference to FIG. 9, there is depicted a non-limiting embodiment of an injection molding system 900 designed to limit or avoid the misalignment problems described above in conjunction with FIG. 8. The injection molding system 900 is in many respects similar to the injection molding system 600 of FIG. 6. For example, the following components of system 900 may function in a manner analogous to their counterparts in the injection molding system 600 of FIG. 6 and will therefore not be described in any detail here: platens 902 and 904; injection unit 906; tie bars 908, 910; tie-bar clamping mechanism 912; mold halves 914 and 916 (collectively forming a "mold"); mold cavities 918; and mold cores 920. However, the preform handling apparatus 922 of molding system 900 has been modified, as described below, from its counterpart preform handling apparatus 622 of FIG. 6 with a view to limiting or eliminating the misalignment problems discussed above.

At a high level, the preform handling apparatus 922 of FIG. 9 serves a similar purpose as preform handling apparatus 622 of FIG. 6, i.e. to retrieve freshly molded preforms from one of the mold halves (in this example, the core half) in preparation for a subsequent molding cycle. As with preform handling apparatus 622 of FIG. 6, the preform handling apparatus 922 includes a beam 924 extending in spatial dimension Z (which may be horizontal), a carriage 925 that rides on beam 924, an actuating arm 926 coupled to the carriage 925, and a take-off device 928 comprising an end-of-arm tool plate 929 with a plurality of preform carriers 930 attached thereto. Also, as with preform handling apparatus 622, the preform handling apparatus 922 may be considered as a form of robot.

However, unlike the preform handling apparatus 622 of FIG. 6, the preform handling apparatus 922 incorporates a take-off device alignment mechanism 923. The purpose of the take-off device alignment mechanism 923 is to maintain an alignment of each preform carrier 930 on end-of-arm tool plate 929 that is being used to retrieve a freshly molded preform with a contact surface of its respective preform, regardless of whether the cylindrical inner and outer surfaces of the body portion of the preform are concentric or non-concentric. As will be described, this may be achieved by setting the inboard preform-loading position of the take-off device 928 based on whether the inner and outer surfaces of a body portion of the preform are concentric or non-concentric.

In FIG. 9, the take-off device alignment mechanism 923 is schematically represented as part of the carriage 925. This is merely to convey the fact that, in the illustrated embodiment, the take-off device alignment mechanism 923 uses the carriage 925 to adjust the inboard preform-loading position of the take-off device 928, in spatial dimension Z, for the above-noted alignment purposes. In practice, the adjustment may actually be achieved through suitable modification, or programming, of a controller that sends commands or control signals for setting the carriage position via an actuator (such as a servo-driven belt drive, which is not expressly depicted). Nevertheless, the representation of the take-off device alignment mechanism 923 as forming part of carriage 925 in FIG. 9 should not be understood to mean that all embodiments of take-off device alignment mechanisms necessarily form part of a carriage or use a carriage to adjust the inboard preform-loading position of the take-off device. Other embodiments may use different mechanisms, as will be described. The adjustment mechanism may be operable to make adjustments automatically, e.g. based on mold ID and/or preform information. The adjustment mechanism may be operable to adjust the preform-loading position based on information entered via a human-machine interface, such as mold ID, preform information, or offset values.

Figure 10:
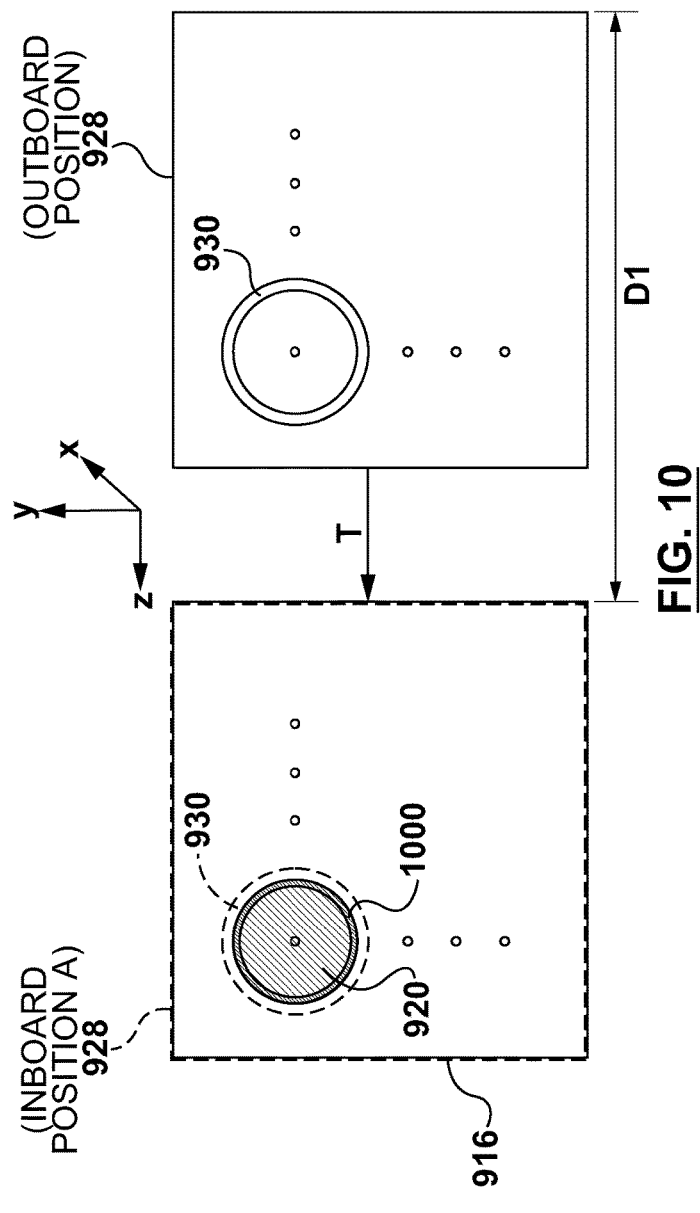
FIG. 10 schematically depicts movement of a take-off device of the system of FIG. 9.
Figure 11:
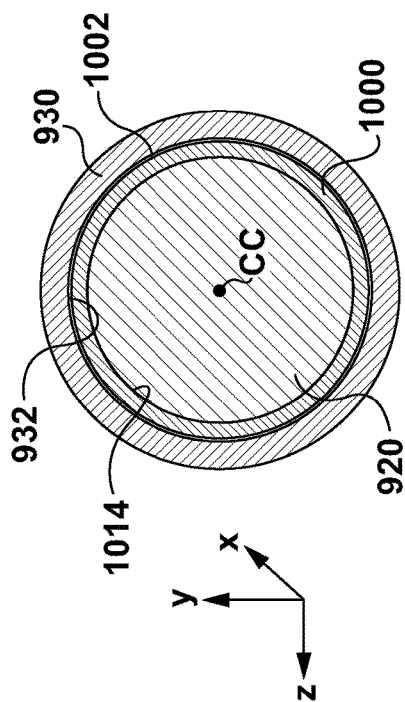
FIG. 11 is a transverse cross-sectional view of a preform carrier in the molding system of FIG. 9 during retrieval of a first type of preform.
Figure 12:
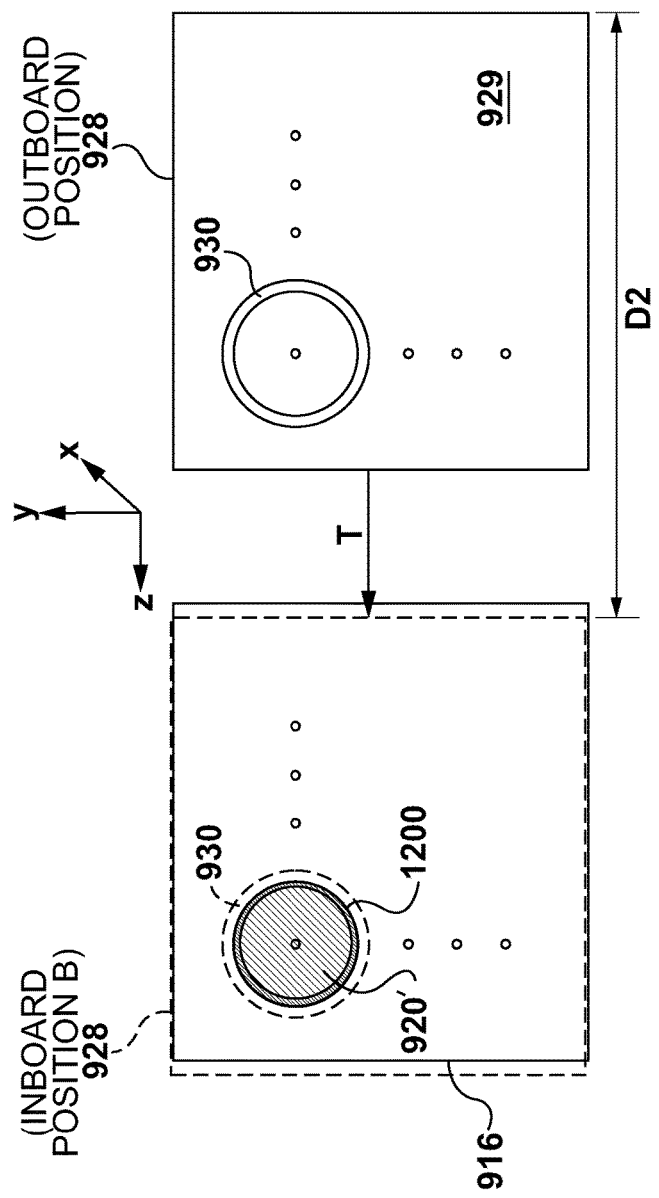
FIG. 12 schematically depicts movement of a take-off device of the system of FIG. 9.
Figure 13:
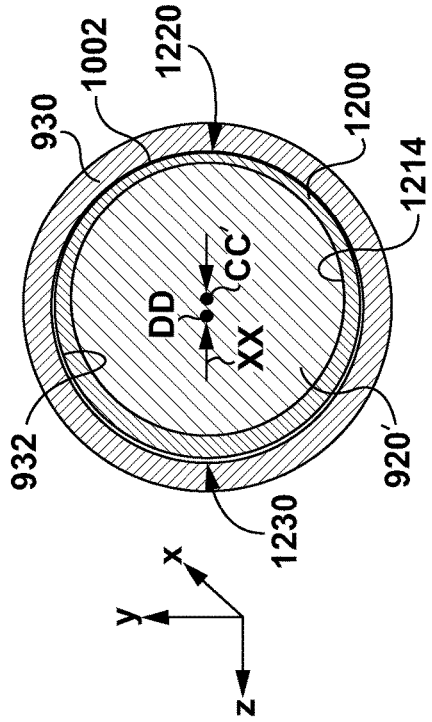
FIG. 13 is a transverse cross-sectional view of a preform carrier in the molding system of FIG. 9 during retrieval of a second type of preform.

Operation of the preform handling apparatus 922 of FIG. 9 is illustrated in FIGS. 10-13. FIG. 10 illustrates movement of the take-off device 928, by preform handling apparatus 922, for retrieving, from mold half 916, preforms 1000 whose body portions have concentric inner and outer surfaces (referred to below as "circumferentially uniform" preforms). FIG. 11 illustrates alignment between a preform carrier 930 and a circumferentially uniform preform 1000 that results from the movement shown in FIG. 10. FIG. 12 illustrates movement of the take-off device 928, by preform handling apparatus 922, for retrieving, from mold half 916, preforms 1200 whose body portions have non-concentric (offset) cylindrical inner and outer surfaces (such preforms referred to below as "circumferentially offset" preforms). FIG. 13 illustrates alignment between a preform carrier 930 and a circumferentially offset preform 1200 that results from the movement shown in FIG. 12.

In FIGS. 10-13, mutually orthogonal spatial dimensions X, Y and Z are consistent with the mutually orthogonal spatial dimensions X, Y and Z, respectively, of FIG. 9.

Beginning with FIG. 10, the take-off device 928 is initially in an outboard position, which corresponds to the outboard position of the take-off device 928 shown in FIG. 9. For clarity, the take-off device 928 is depicted schematically in FIG. 10 to show only a single example preform carrier 930. It will be appreciated that the take-off device 928 may in fact have many similar preform carriers 930 attached thereto, e.g. arranged in rows and/or columns. It will also be appreciated that the depiction of example preform carrier 930 in FIG. 10 is not to scale with the depicted end-of-arm tool plate 929 to which it is attached. The preform carrier 930 is tubular in this embodiment and is sized and shaped appropriately for holding the circumferentially uniform preform 1000 by an outer cylindrical surface.

FIG. 10 includes a schematic depiction of mold half 916, showing a single example mold core 920. It will be appreciated that the mold half 916 may in fact have many similar mold cores 920 attached thereto, e.g. arranged in rows and/or columns. The number of mold cores 920 may be a divisor of the number of preform carriers 930 on the take-off device 928 (given that take-off device 928 may be able to simultaneously hold multiple batches of recently molded preforms at different stages of cooling). A freshly molded, circumferentially uniform preform 1000 is depicted in FIG. 10 in association with the mold core 920. The mold half 916 is understood to be in a mold-open position, which corresponds to the mold open position of FIG. 9.

When it is time for the preform 1000 to be retrieved from the mold core 920, the take-off device 928 is translated (moved), along a linear trajectory T (i.e. in spatial dimension Z), from the outboard position to an inboard preform-loading position, which is depicted in dashed lines and is referred to as "inboard position A" in FIG. 10. Movement of the take-off device 928 may be effected by a controller sending control signals or commands to an actuator that drives carriage 925 along beam 924 (FIG. 9). The distance moved by the take-off device 928 between the outboard position and inboard position A is denoted DI.

It will be appreciated that, when the take-off device 928 reaches the inboard position A, the preform carrier 930 will be aligned (in this example, in spatial dimension Z, as well as dimension Y) with the mold core 920, and accordingly, will also be aligned with the circumferentially uniform preform 1000 sitting on mold core 920. This is shown in greater detail in FIG. 11.

FIG. 11 is a transverse cross-sectional view of the preform carrier 930 when the take-off device 928 is in the inboard preform-loading position A of FIG. 10. The cross-section of FIG. 11 is taken through the body portion of preform 1000 as the preform carrier 930 retrieves the preform 1000 from the mold core 920. It can be seen that the preform carrier 930 is concentric with the mold core 920, in the sense that both share a common longitudinal axis CC. Because the preform 1000 is circumferentially uniform, the preform carrier 930 is also aligned with the contact surface 1002 of preform 1000 (i.e. cylindrical inner surface 932 of the preform carrier 930 is concentric with the cylindrical outer surface 1002 of the preform 1000).

Turning to FIG. 12, whose conventions match those of FIG. 10, it is presumed that the injection molding system 900 has been reconfigured for molding different preforms, i.e. circumferentially offset preforms 1200, as shown in association with the mold core 920' on mold half 916. Reconfiguration may entail substitution of suitable cavity inserts and/or core inserts into mold half 914 and/or mold half 916 in place of the ones used previously to mold preforms 1000; as such, mold core 920' may be identical to, or different, from mold core 920. As part of the conversion, the take-off device alignment mechanism 923 adjusts the inboard preform-loading position from inboard position A of FIG. 10 to inboard position B of FIG. 12, discussed below.

In some embodiments, adjustment may be facilitated using an HMI. An operator may use the HMI to set or adjust a value that determines the stopping position for the robot, e.g. by way of an encoder. In other embodiments, adjustment of the inboard preform-loading position may be done by mechanical adjustments. For example, alignment pins (or other adjustment devices) could be used to adjust the end-of-arm tool plate 929 position on actuating arm 926. Different pins could be used for different degrees of offset, depending upon the degree of offset between the cylindrical inner and outer surfaces of the preforms to be handled.

A possible alternative could be to provide alignment holes on mold half 916 that are specific to the degree of offset between the inner and outer surfaces of the preforms to be handled.

FIG. 13 illustrates an example preform 1200 that may be produced by the reconfigured mold. As illustrated, the preform 1200 has a cylindrical outer surface 1202, which is non-concentric with longitudinal axis CC' of the mold core 920'. That is, the outer surface 1202 is centered about a longitudinal axis DD, which is parallel to but offset, in spatial dimension Z (the "offset dimension" in this example), from axis CC', by a distance XX. Notably, in this embodiment, the offset dimension is intentionally aligned with the dimension in which the take-off device 928 moves (i.e. spatial dimension Z). This alignment can be achieved through suitable selection and/or suitable orientation of mold cavity inserts and/or mold core inserts used to mold the preform 1200. The reason for the alignment is to allow the take-off device alignment mechanism 923 to easily adjust or redefine the inboard preform-loading position from inboard position A to inboard position B by adjusting a stop position of carriage 925 on beam 924, as discussed below.

Referring again to FIG. 12, when it is time for the circumferentially offset preform 1200 to be retrieved from the mold core 920', the take-off device 928 is translated (moved), along a linear trajectory T (i.e. in spatial dimension Z), from the same initial outboard position as in FIG. 10 to a new inboard preform-loading position, which is denoted in dashed lines as "inboard position B" in FIG. 12. Notably, inboard position B differs from inboard position A of FIG. 10 in that the former is offset from the latter by the offset amount XX depicted in FIG. 13, i.e. by the offset distance between longitudinal axis CC' of the cylindrical inner surface 1214 of the preform and parallel longitudinal axis DD of the outer surface 1202 of the preform 1200. The offset amount XX may be one-half of a difference in wall thickness between a thickest wall 1320 of the body portion of the preform 1200 (at the left side of FIG. 13) and a thinnest wall 1220 of the body portion of the preform 1200 (at the right side of FIG. 13).

Thus, when the take-off device 928 reaches the inboard preform-loading position B, the contact surface 932 of preform carrier 930 will be aligned (concentric) with the outer surface 1202 of the circumferentially offset preform, but will no longer be aligned with the mold core 920'. This is shown in greater detail in FIG. 13.

Referring to FIG. 13, whose conventions match those of FIG. 11, it can be seen that the inner cylindrical surface 932 of preform carrier 930 is aligned (concentric) with outer cylindrical contact surface 1202 of the circumferentially uniform preform 1000 (albeit not with mold core 920'). This may alternatively be referred to as aligning the preform carrier 930 with the contact surface 1202 of the preform 1000. In this position, a risk of damage to an outer surface 1202 of the preform 1200 during preform retrieval by preform carrier 930 may be reduced in comparison with the scenario depicted in FIG. 8 for example.

It will be appreciated that, in the above example, the offset dimension (i.e. the spatial dimension in which the cylindrical inner and outer surfaces of the body portion of the preform are offset from one another) is aligned with the dimension of translation (movement) of the take-off device, i.e. spatial dimension Z in this example. This approach may yield a number of benefits.

For example, when the injection molding system is being changed from molding circumferentially uniform preforms to molding circumferentially offset preforms or vice-versa, there may be no need to change the hardware of the end-of-arm tool and/or take-off device (e.g. mounting and/or adjustment of an end-of-arm tool plate and/or individual preform carriers). All that may need to be done is to adjust the inboard preform-loading position, e.g. through adjusting a stop position of a take-off device via the take-off device alignment mechanism 923.

The time required for changeover from molding preforms having a constant wall thickness to molding offset preforms having a variable wall thickness may be reduced, e.g. in comparison to embodiments wherein take-off device hardware changes must be made manually to effect such a changeover.

Further, the same end-of-arm tool plate may be usable for both circumferentially uniform and circumferentially offset preforms. As a result, the risk of mistakenly using a plate intended for a different purpose may be reduced.

Finally, the above approach may allow a standard treatment device, as may normally be used for treating (e.g. blowing air into) circumferentially uniform preforms, to also be usable for treating circumferentially offset preforms. The reason is that the cylindrical inner surface 1014 of a circumferentially uniform preform 1000 being held in inboard position A (see FIGS. 10 and 11) may be positioned in the same place as the cylindrical inner surface 1214 of a circumferentially offset preform 1000 held in inboard position B (see FIGS. 12 and 13).

Various alternative embodiments are possible.

For example, in the embodiment described in conjunction with FIGS. 9-13, the offset dimension (i.e. the spatial dimension in which the cylindrical inner and outer surfaces of the body portion of the preform are offset from one another) is aligned with the dimension of movement of the take-off device 928 (spatial dimension Z in the example). It should be appreciated that, although such alignment may afford certain benefits as discussed above, it is not required for the offset dimension to match the dimension of movement of the take-off device in all embodiments.

For example, a possible alternative solution for the misalignment shown in FIG. 8 could be to reposition the preform carrier 630 (FIG. 6), in a spatial dimension that is orthogonal to the dimension of movement of the take-off device (e.g. in FIG. 8, downwardly in spatial dimension Y), relative to the take-off plate to which the preform carrier 630 is attached. In particular, if the preform carrier 630 were repositioned on the plate so that, when the take-off device is in the inboard preform-loading position, the inwardly facing cylindrical contact surface 632 of the preform carrier 630 were centered about longitudinal axis D of FIG. 8 rather than longitudinal axis C, alignment could be achieved. Alternatively, the entire end-of-arm tool plate 629 comprising the take-off device 628 (see FIG. 6) could be moved as a unit relative to the arm 626 in spatial dimension Y, or perhaps swapped for a different plate on which all preform carriers have been so repositioned in spatial dimension Y. The moving or swapping a plate as a whole might be considered less time consuming than adjusting the preform carrier positions individually. A possible cost of any of the approaches introduced in this paragraph may be lost system productivity, if it is required to take the molding system offline to reposition the preform carriers or move or swap the end-of-arm tool plate, for example. This cost may be considered acceptable in some cases.

It should further be appreciated that, in some alternative embodiments, each preform carrier may be designed to remove a preform from a respective mold cavity 918 of mold cavity half 914 rather than from a mold core 920, 920' of mold half 916. In such embodiments, the preform carrier may be configured (e.g. sized and shaped) to hold a preform 300 by a contact surface forming part of the inner cylindrical surface of (the body portion of) the preform. The take-off device alignment mechanism in such embodiments may be designed to maintain the preform carrier in alignment with the inner cylindrical contact surface of the preform regardless of any offset between a longitudinal axis of the cylindrical inner surface of the preform and a longitudinal axis of the cylindrical outer surface of the preform.

Description of the non-limiting embodiments of the present technology provides examples of the present technology, and these examples do not limit the scope of the present technology. It is to be expressly understood that the scope of the present technology is limited by the claims. The concepts described above may be adapted for specific conditions and/or functions, and may be further extended to a variety of other applications that are within the scope of the present technology. Having thus described the non-limiting embodiments of the present technology, it will be apparent that modifications and enhancements are possible without departing from the concepts as described. Therefore, what is to be protected by way of letters patent are limited only by the scope of the following claims.

What is claimed is:

1. A preform comprising:
   a neck portion;
   a base portion; and
   a body portion extending between the neck portion and the base portion;
   the body portion being defined between an inner surface having a circular transverse cross-sectional shape and an outer surface also having a circular transverse cross-sectional shape, the inner and outer surfaces having respective longitudinal axes that are offset from one another along substantially the entire length of the body portion, such that a wall thickness of the body portion varies circumferentially around the preform;
   wherein the base portion is defined between an inner end surface and an outer end surface that extend from the inner surface of the body portion and the outer surface of the body portion, respectively, coaxially therewith, wherein a base thickness of the base portion varies circumferentially around the preform within a region of the base portion defined by the circumference of the inner surface of the body portion,
   wherein the longitudinal axis of the inner surface of the body portion is offset from the longitudinal axis of the outer surface of the body portion by an offset amount that is one-half of a difference in wall thickness between a thickest wall of the body portion of the preform and a thinnest wall of the body portion of the preform.

2. The preform of claim 1, wherein the wall thickness comprises a first wall thickness at a first point of a plurality of points around a circumference of the body portion and a second wall thickness at a second point of the plurality of points around the circumference of the body portion.

3. The preform of claim 2, wherein the first wall thickness and the second wall thickness are selected based on blow-molding considerations for the first point and the second point respectively.

4. The preform of claim 3, wherein the first wall thickness is larger than the second wall thickness where a travel distance of the first point during a blow-molding process will be longer than a travel distance of the second point during the blow-molding process.

5. The preform of claim 1, wherein the base portion has one of a substantially hemispherical or conical shape that terminates in a vestige portion.

* * * * *